(12) United States Patent
Masaki et al.

(10) Patent No.: US 8,665,502 B2
(45) Date of Patent: Mar. 4, 2014

(54) IMAGE READING DEVICE, IMAGE READING METHOD, AND IMAGE FORMING APPARATUS

(75) Inventors: Shinji Masaki, Kanagawa (JP); Atsushi Kaneko, Kanagawa (JP); Hiromi Kita, Kanagawa (JP); Kenji Yamada, Kanagawa (JP); Nobutoshi Hamasaki, Kanagawa (JP); Nobuyuki Maruno, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 36 days.

(21) Appl. No.: 13/546,728

(22) Filed: Jul. 11, 2012

(65) Prior Publication Data

US 2013/0182296 A1    Jul. 18, 2013

(30) Foreign Application Priority Data

Jan. 16, 2012    (JP) ................................. 2012-006515

(51) Int. Cl.
*H04N 1/04*    (2006.01)

(52) U.S. Cl.
USPC ........... 358/488; 358/462; 358/498; 271/227; 382/218; 382/289; 399/394

(58) Field of Classification Search
USPC ........ 358/488, 1.15, 498, 497, 496, 462, 448; 382/218, 321, 288, 289; 399/297, 367, 399/66, 394; 271/227, 265.01, 228
See application file for complete search history.

(56) References Cited

U.S. PATENT DOCUMENTS

| | | | | |
|---|---|---|---|---|
| 5,528,387 A | * | 6/1996 | Kelly et al. | 358/488 |
| 5,825,947 A | * | 10/1998 | Sasaki et al. | 382/321 |
| 5,901,253 A | * | 5/1999 | Tretter | 382/289 |
| 6,718,071 B2 | * | 4/2004 | Yoshida et al. | 382/289 |
| 7,417,757 B2 | * | 8/2008 | Shinohara | 358/1.15 |
| 7,472,905 B2 | * | 1/2009 | Inoue | 271/227 |
| 7,583,927 B2 | * | 9/2009 | Takahashi et al. | 399/395 |
| 7,753,370 B2 | * | 7/2010 | Inoue | 271/239 |
| 7,778,579 B2 | * | 8/2010 | Ueda et al. | 399/301 |
| 8,292,293 B2 | * | 10/2012 | Inoue | 271/227 |
| 8,480,081 B2 | * | 7/2013 | Inoue | 271/227 |
| 2005/0219652 A1 | * | 10/2005 | Park | 358/488 |
| 2009/0009825 A1 | | 1/2009 | Honda | |

FOREIGN PATENT DOCUMENTS

| | | |
|---|---|---|
| JP | 08-163327 A | 6/1996 |
| JP | 10-191026 A | 7/1998 |
| JP | 2009-017409 A | 1/2009 |

* cited by examiner

*Primary Examiner* — Negussie Worku

(74) *Attorney, Agent, or Firm* — Sughrue Mion, PLLC

(57) ABSTRACT

An image reading device includes a transporter transporting a document to a reading position, a first corrector correcting a skew of the document by coming into contact with a leading edge thereof, a radiating unit radiating light to the document, an image-information acquiring unit acquiring image information of the document based on information of light reflected therefrom, a reflector reflecting the radiated light, a leading-edge detector comparing a quantity of light reflected by the reflector with a quantity of light reflected by the document so as to detect the leading edge, a skew-amount calculator calculating a skew amount of the leading edge, and a second corrector correcting a skew of the image information based on the skew amount. The device switches between the skew correction by the first corrector and the skew correction by the second corrector based on document information, the skew amount, or user's selection.

15 Claims, 18 Drawing Sheets

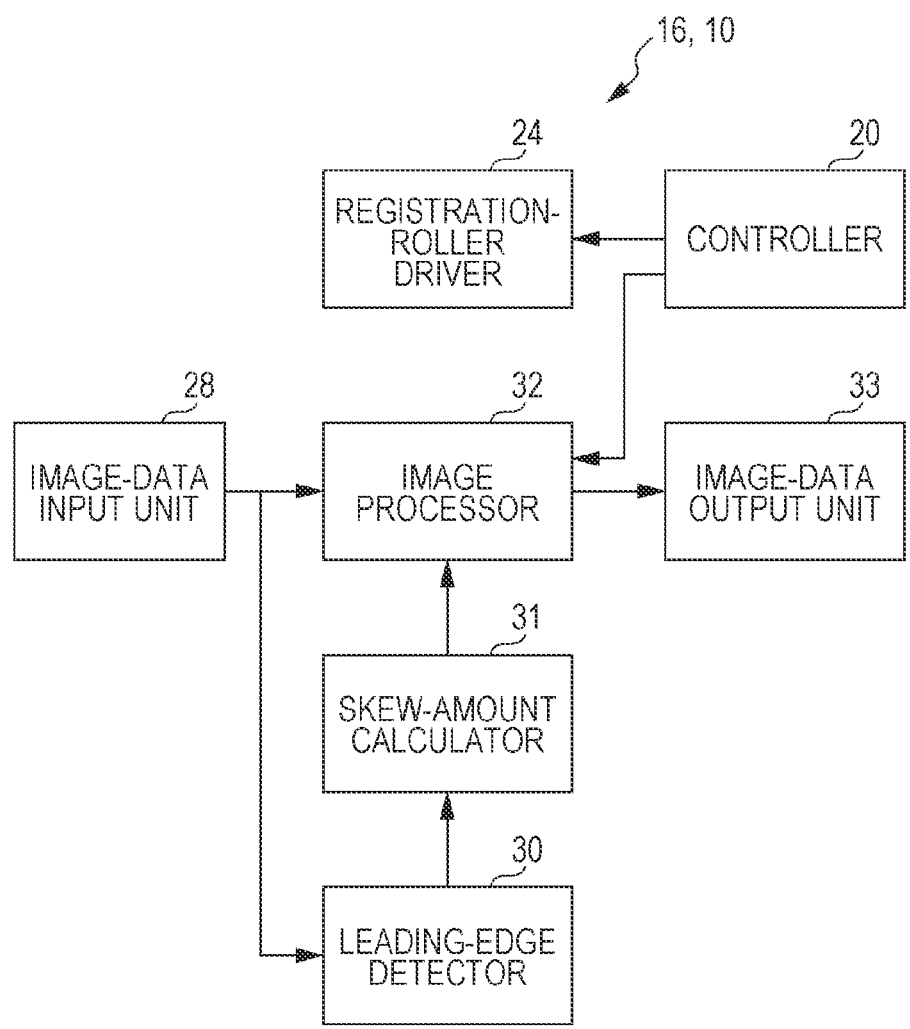

IMAGE READING DEVICE, IMAGE READING METHOD, AND IMAGE FORMING APPARATUS

CROSS-REFERENCE TO RELATED APPLICATIONS

This application is based on and claims priority under 35 USC 119 from Japanese Patent Application No. 2012-006515 filed Jan. 16, 2012.

BACKGROUND

Technical Field

The present invention relates to image reading devices, image reading methods, and image forming apparatuses.

SUMMARY

According to an aspect of the invention, there is provided an image reading device including a transport unit, a first correcting unit, a radiating unit, an image-information acquiring unit, a reflecting unit, a leading-edge detecting unit, a skew-amount calculating unit, and a second correcting unit. The transport unit transports a document having an image formed thereon to a reading position. The first correcting unit is provided upstream of the reading position in a transport direction of the document and corrects a skew of the document by coming into contact with a leading edge of the document. The radiating unit radiates light to the document at the reading position. The image-information acquiring unit acquires information of the image formed on the document on the basis of information of light reflected by the document. The reflecting unit is provided opposite the radiating unit with the document interposed therebetween at the reading position and reflects the light radiated from the radiating unit. The leading-edge detecting unit compares a quantity of the light reflected by the reflecting unit with a quantity of the light reflected by the document so as to detect the leading edge of the document passing through the reading position. The skew-amount calculating unit calculates a skew amount of the leading edge of the document detected by the leading-edge detecting unit. The second correcting unit corrects a skew of the image information acquired by the image-information acquiring unit on the basis of the skew amount of the leading edge calculated by the skew-amount calculating unit. The image reading device switches between the skew correction by the first correcting unit and the skew correction by the second correcting unit on the basis of document information, the skew amount of the leading edge calculated by the skew-amount calculating unit, or user's selection.

BRIEF DESCRIPTION OF THE DRAWINGS

Exemplary embodiments of the present invention will be described in detail based on the following figures, wherein:

FIG. 6 is a block diagram of the image reading section according to the first exemplary embodiment of the present invention;

DETAILED DESCRIPTION

First Exemplary Embodiment

An image reading device and an image forming apparatus according to a first exemplary embodiment of the present invention will now be described.

Overall Configuration

Figure 1:
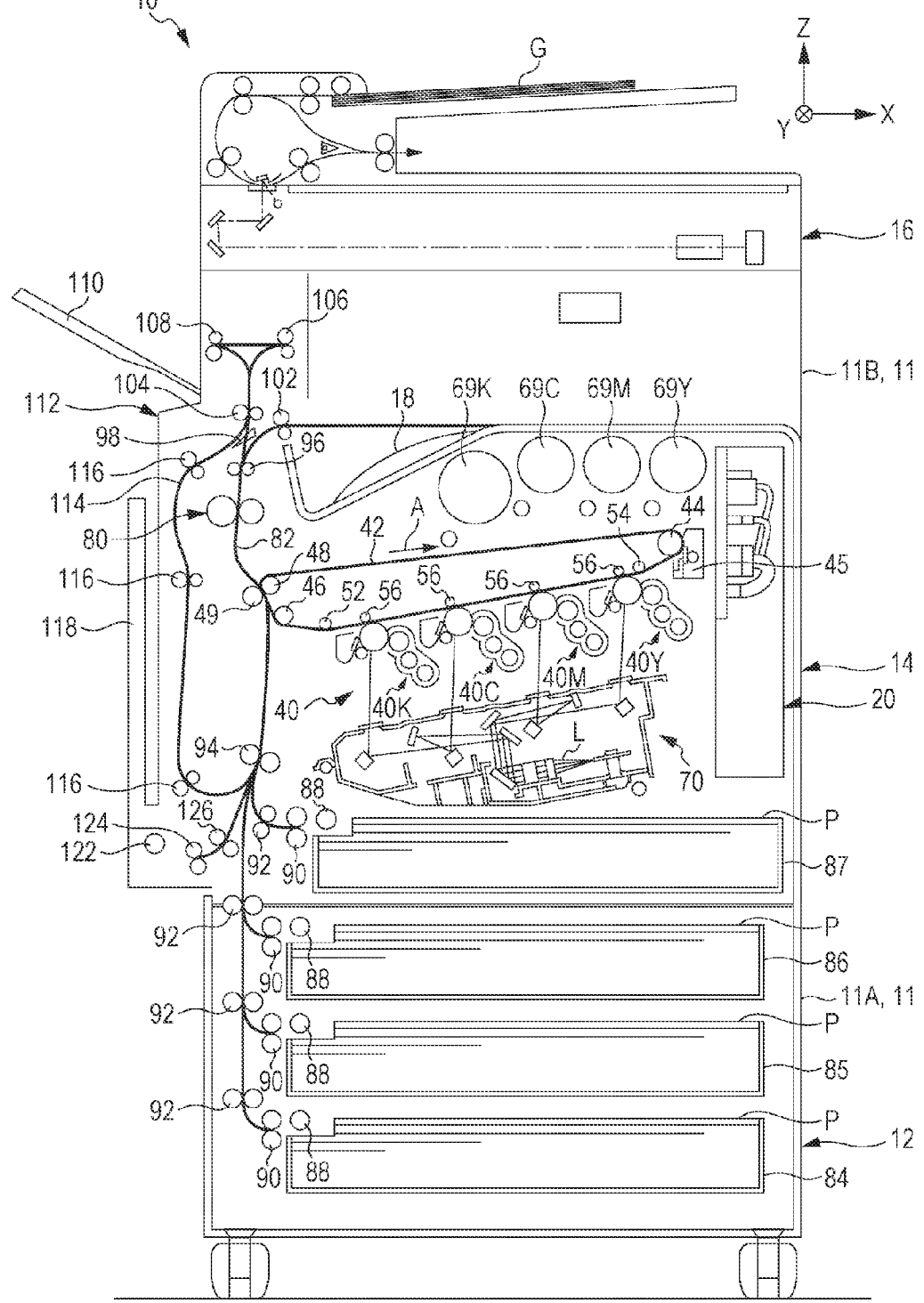
FIG. 1 illustrates an overall configuration of an image forming apparatus according to a first exemplary embodiment of the present invention.

FIG. 1 illustrates an image forming apparatus 10 according to the first exemplary embodiment. In the following order from the bottom, the image forming apparatus 10 includes a paper accommodation section 12 that accommodates therein recording paper P as an example of a recording medium, an image forming section 14 that forms an image on the recording paper P, and an image reading section 16 as an example of an image reading device that reads image information from a document G having an image formed thereon. After an image is formed on the recording paper P, the recording paper P is output to an output section 18 disposed in an upper area of the image forming section 14 and below the image reading section 16. The term "image" on the document G is not limited to an image formed in the image forming apparatus 10, but may include a hand-drawn image or pattern.

The image forming apparatus 10 has a housing 11. In the first exemplary embodiment, the housing 11 includes, for example, a housing 11A that constitutes the body of the paper accommodation section 12, and a housing 11B that constitutes the body of the image forming section 14. Multiple image forming units 40 that form toner images of different colors are provided at a mid-portion of the housing 11B in the vertical direction (i.e., a direction indicated by an arrow Z) and are arranged slantwise relative to the horizontal direction (i.e., a direction indicated by an arrow X).

Furthermore, an endless intermediate transfer belt 42 wound around a rotationally-driven drive roller 44, a tension applying roller 46 that applies tension, a driven support roller 48, a first idle roller 52, a second idle roller 54, and first-transfer rollers 56, to be described below, is provided above the image forming units 40. The intermediate transfer belt 42 is rotated in a direction indicated by an arrow A so that the toner images formed by the image forming units 40 for the respective colors are first-transferred onto the intermediate transfer belt 42.

In the following description, when the image forming apparatus 10 is viewed from the front, a rightward direction will be defined as "X direction", an upward direction will be defined as "Z direction", and a depth direction substantially orthogonal to the X direction and the Z direction will be defined as "Y direction".

Figure 2:
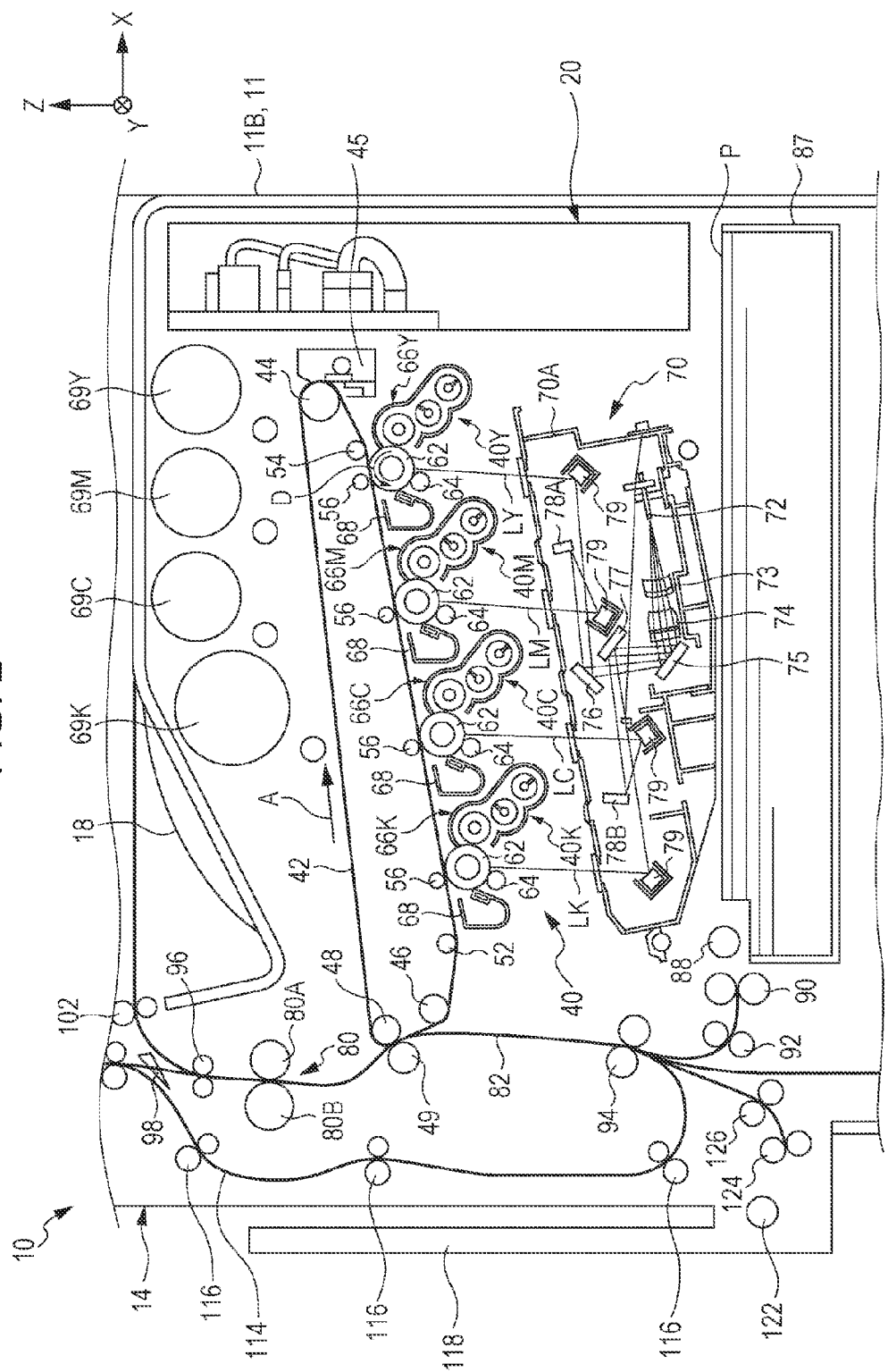
FIG. 2 illustrates a partial configuration of an image forming section according to the first exemplary embodiment of the present invention.

Referring to FIG. 2, in the image forming apparatus 10, four image forming units 40Y, 40M, 40C, and 40K respectively corresponding to yellow (Y), magenta (M), cyan (C), and black (K) colors are arranged in that order toward the downstream side in the moving direction (i.e., the direction of the arrow A) of the intermediate transfer belt 42.

The image forming units 40Y, 40M, 40C, and 40K are arranged slantwise relative to the X direction at a fixed pitch such that the image forming unit 40Y is disposed at the highest position, whereas the image forming unit 40K is disposed at the lowest position. The image forming units 40Y, 40M, 40C, and 40K have similar configurations except for the toners accommodated therein. In the following description, the characters Y, M, C, and K corresponding to the respective colors will be added to the reference numerals when distinguishing the colors from each other, but these characters Y, M, C, and K will be omitted if the colors are not to be particularly distinguished from each other.

Each image forming unit 40 is provided with a photoconductor 62 that is rotated in a direction indicated by an arrow D (i.e., counterclockwise direction) by a driver (not shown), and is also provided with a charging member 64 that faces the surface (outer peripheral surface) of the photoconductor 62 so as to electrostatically charge the surface of the photoconductor 62. An exposure unit 70 is disposed slantwise below the multiple image forming units 40 so as to extend along the image forming units 40.

The exposure unit 70 performs an exposure process on the four photoconductors 62 by irradiating them with laser beams LY, LM, LC, and LK so as to form electrostatic latent images on the photoconductors 62. Specifically, the exposure unit 70 has a body 70A fixed to a predetermined position of the image forming apparatus 10. The body 70A is provided with a light source (not shown) that emits a laser beam LY for the yellow color, a laser beam LM for the magenta color, a laser beam LC for the cyan color, and a laser beam LK for the black color.

The exposure unit 70 is provided with a polygonal mirror 72 that has multiple reflective surfaces and that reflects the laser beams emitted from the light source while rotating so as to scan the laser beams across the photoconductors 62 in the main scanning direction. Furthermore, a first fθ lens 73 and a second fθ lens 74 that receive the four laser beams LY, LM, LC, and LK reflected by the polygonal mirror 72 are provided on the optical paths of the laser beams at the downstream side of the polygonal mirror 72. A flat mirror 75 that reflects the four laser beams LY, LM, LC, and LK toward a direction substantially orthogonal to the direction in which the laser beams are received is provided on the optical paths at the downstream side of the second fθ lens 74.

A flat mirror 76 that reflects the laser beams LY and LM and a flat mirror 77 that reflects the laser beams LC and LK in a direction opposite to the direction in which the laser beams LY and LM are reflected are provided on the optical paths at the downstream side of the flat mirror 75. Furthermore, flat mirrors 78A and 78B that reflect the laser beams LM and LC and four cylindrical mirrors 79 that reflect the laser beams LY, LM, LC, and LK toward the corresponding photoconductors 62 to form images thereon are provided at the downstream side of the flat mirrors 76 and 77.

Developing units 66 (66Y, 66M, 66C, and 66K) that develop the electrostatic latent images formed on the surfaces of the photoconductors 62 by using toners of predetermined colors so as to form visible images are provided at the downstream side of the charging members 64 in the rotational direction of the photoconductors 62. The aforementioned first-transfer rollers 56 that first-transfer the toner images formed on the surfaces of the photoconductors 62 onto the intermediate transfer belt 42 based on a potential difference therebetween are provided at the downstream side of the developing units 66 in the rotational direction of the photoconductors 62. More specifically, the first-transfer rollers 56 are disposed opposite the photoconductors 62 with the intermediate transfer belt 42 interposed therebetween.

Furthermore, cleaning units 68 that remove residual toner remaining on the surfaces of the photoconductors 62 without being first-transferred onto the intermediate transfer belt 42 are provided at the downstream side of the first-transfer rollers 56 in the rotational direction of the photoconductors 62. Each image forming unit 40 is constituted of the photoconductor 62, the charging member 64, the developing unit 66, and the cleaning unit 68. A controller 20 is provided at a position adjacent to (i.e., right side in FIG. 2) the image forming units 40 and the exposure unit 70. Specifically, the controller 20 controls the operation of each component in the image forming apparatus 10 and also switches between a registration-roller driver 24 (see FIG. 6) and an image processor 32 (see FIG. 6), to be described later.

Toner cartridges 69Y, 69M, 69C, and 69K that supply toners of predetermined colors to the Y, M, C, and K developing units 66 are provided above the intermediate transfer belt 42. The toner cartridge 69K containing black (K) toner is frequently used and is thus given a larger size than the other toner cartridges.

A cleaning device 45 that cleans the surface of the intermediate transfer belt 42 is provided opposite the drive roller 44 with the intermediate transfer belt 42 interposed therebetween. The cleaning device 45 is attachable to and detachable from the housing 11B by opening a front cover (not shown) forward, which is provided at the front side (i.e., the front side where a user may stand) of the housing 11B.

A second-transfer roller 49 that second-transfers the toner images first-transferred on the intermediate transfer belt 42 onto the recording paper P based on a potential difference between the second-transfer roller 49 and the support roller 48 is provided opposite the support roller 48 with the intermediate transfer belt 42 interposed therebetween. A position between the second-transfer roller 49 and the support roller 48 is defined as a second-transfer position where the toner images are transferred onto the recording paper P. A fixing device 80 that fixes the toner images onto the recording paper P having the toner images transferred thereto by the second-transfer roller 49 is provided above the second-transfer roller 49.

The fixing device 80 includes a heating roller 80A having a heat source for heating the toner on the recording paper P so as to fuse the toner therewith, and a pressing roller 80B that presses the recording paper P toward the outer peripheral surface of the heating roller 80A. A transport path 82 extending in the Z direction is provided at the left side within the image forming apparatus 10, such that the recording paper P is transported along the transport path 82 in the Z direction.

As shown in FIG. 1, in the paper accommodation section 12, paper feeders 84, 85, and 86 that accommodate recording paper P of different sizes are provided in three levels in the Z direction. Furthermore, a paper feeder 87 that accommodates recording paper P is provided in a lower area of the image forming section 14. The paper feeders 84, 85, 86, and 87 are each provided with a paper feed roller 88 that feeds the accommodated recording paper P to the transport path 82. Moreover, for each paper feeder, a transport roller 90 and a transport roller 92 that transport multiple sheets of recording paper P in a one-by-one fashion are provided at the downstream side of the paper feed roller 88 in the transport direction. A positioning roller 94 that temporarily stops the recording paper P and then sends the recording paper P to the second-transfer position at a predetermined timing is provided in the transport path 82 at the downstream side of the transport rollers 92 in the transport direction of the recording paper P.

A transport roller 96 that transports the recording paper P having the toner images fixed thereon toward the downstream side is provided at the downstream side (i.e., upper side in FIGS. 1 and 2) of the fixing device 80 in the transport direction of the recording paper P. Moreover, a switch gate 98 that switches the transport direction of the recording paper P by pivoting is provided at the downstream side of the transport roller 96 in the transport direction of the recording paper P.

A first output roller 102 that outputs the recording paper P guided by the switch gate 98 switched to a first direction toward the output section 18 is provided in the transport path 82 at the downstream side of the switch gate 98 in the transport direction of the recording paper P. Moreover, a second output roller 106 and a third output roller 108 are provided in the transport path 82 at the downstream side of the switch gate 98 in the transport direction of the recording paper P. Specifically, the recording paper P guided by the switch gate 98 switched to a second direction and transported by a transport roller 104 is output to an output section (not shown) provided above the output section 18 by the second output roller 106 or to an output section 110 disposed on the opposite side of the second output roller 106 by the third output roller 108.

A duplex-printing transport unit 112 that turns over and transports the recording paper P so that images are formed on both sides of the recording paper P is provided beside (left side in FIGS. 1 and 2) the second-transfer position. The duplex-printing transport unit 112 is provided with an inversion path 114 to which the recording paper P is transported by reversing the rotation of the transport roller 104. The duplex-printing transport unit 112 is also provided with multiple transport rollers 116 along the inversion path 114. In a state where the recording paper P is turned over, the recording paper P is transported again to the positioning roller 94 by these transport rollers 116.

A foldable manual paper feeder 118 is provided beside (left side in FIGS. 1 and 2) the duplex-printing transport unit 112. A paper feed roller 122 and transport rollers 124 and 126 that transport the recording paper P toward the transport path 82 are provided in an area within the housing 11B to which the recording paper P from the manual paper feed section 118 is fed. The recording paper P transported by the transport rollers 124 and 126 is transported by the positioning roller 94.

Next, an image forming process in the image forming apparatus 10 will be described.

As shown in FIG. 1, when the image forming apparatus 10 is activated, an image-data output unit 33 (see FIG. 6) or an external source sequentially outputs image information (image data) for the Y, M, C, and K colors to the exposure unit 70. Then, the surfaces (outer peripheral surfaces) of the photoconductors 62 electrostatically charged by the corresponding charging members 64 (see FIG. 2) are exposed to light beams L emitted from the exposure unit 70 in accordance with the image data, whereby electrostatic latent images are formed on the surfaces of the photoconductors 62. Subsequently, the electrostatic latent images formed on the surfaces of the photoconductors 62 are respectively developed into Y, M, C, and K toner images by the developing units 66Y, 66M, 66C, and 66K (see FIG. 2).

Then, the Y, M, C, and K toner images sequentially formed on the surfaces of the photoconductors 62 are sequentially superposed and transferred onto the intermediate transfer belt 42 by the first-transfer rollers 56. Subsequently, the toner images superposed and transferred on the intermediate transfer belt 42 are second-transferred, by the second-transfer roller 49, onto the recording paper P transported to the second-transfer position.

Then, the recording paper P having the toner images transferred thereon is transported toward the fixing device 80. In the fixing device 80, the toner images on the recording paper P are heated and pressed so as to be fixed onto the recording paper P. The recording paper P having the toner images fixed thereon is, for example, output to the output section 18. If an image is to be formed on a non-image surface (rear surface) not having an image formed thereon (i.e., in the case of duplex-printing), the recording paper P having the image fixed on the front surface thereof by the fixing device 80 is transported to the inversion path 114 so that an image forming process and a fixing process are performed on the rear surface of the recording paper P.

Configuration of Relevant Components

Next, the image reading section 16 according to the first exemplary embodiment will be described.

Figure 3:
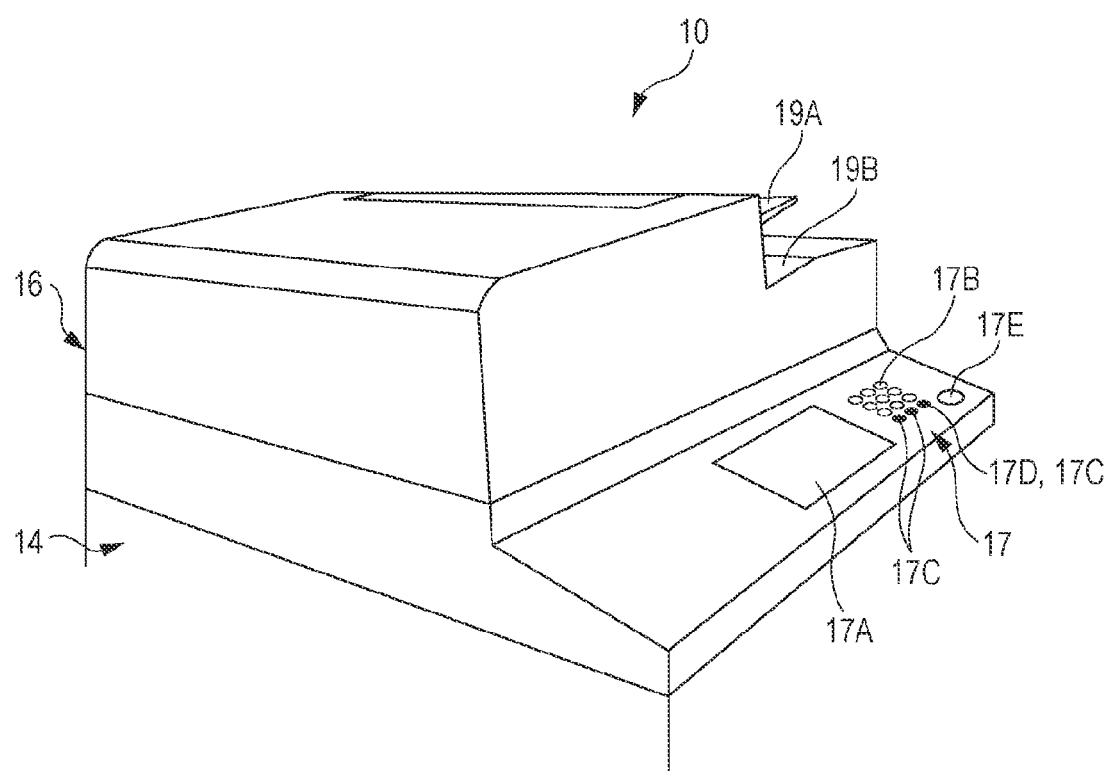
FIG. 3 is an external perspective view of an image reading section according to the first exemplary embodiment of the present invention.

Referring to FIG. 3, the front side of the body of the image reading section 16 is provided with an operation panel 17 that is operable by a user. The operation panel 17 includes a display panel 17A that displays notification information for the user, and a key input portion 17B to be used by the user for inputting various settings. The key input portion 17B is provided with selection keys 17C as an example of a document selecting unit to be used by the user for selecting the type of document G in advance, and a read start button 17E for the document G.

Figure 4:
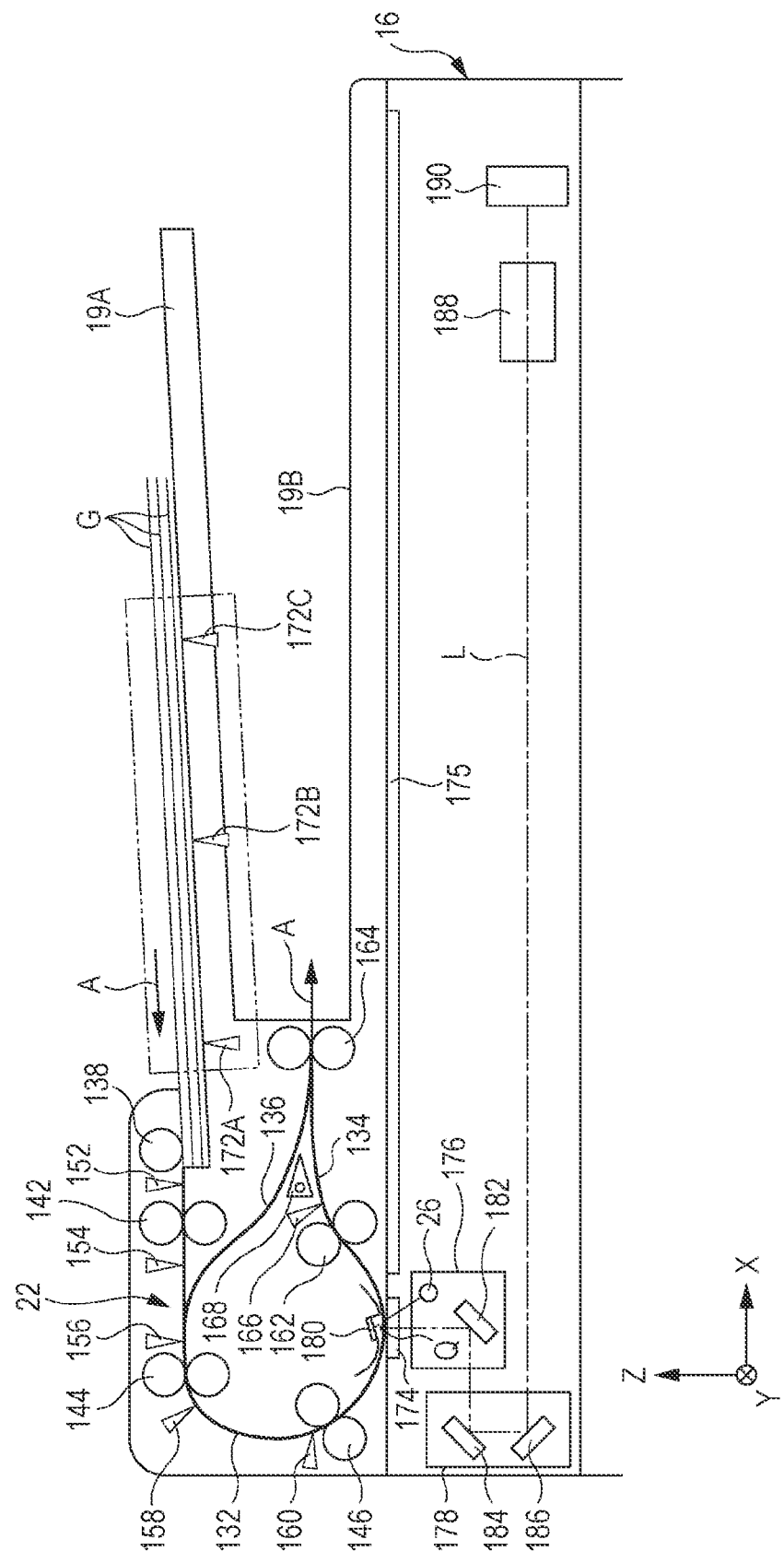
FIG. 4 illustrates a partial configuration of the image reading section according to the first exemplary embodiment of the present invention.

Referring to FIG. 4, the image reading section 16 is provided with a document tray 19A as an example of a document loading portion on which a document G is placed. Documents G of various sizes can be placed on the document tray 19A. Specifically, with regard to documents G that can be placed on the document tray 19A, at least one of the document length, which is a distance in the transport direction (i.e., direction of the arrow A) of the documents G, and the document width, which is a distance in the direction substantially orthogonal to the transport direction, is different among the documents G. The document tray 19A can be moved upward or downward by a lifter (not shown) while documents G are placed thereon. An output tray 19B onto which documents G having undergone an image reading process are output is provided below the document tray 19A.

Figure 5:
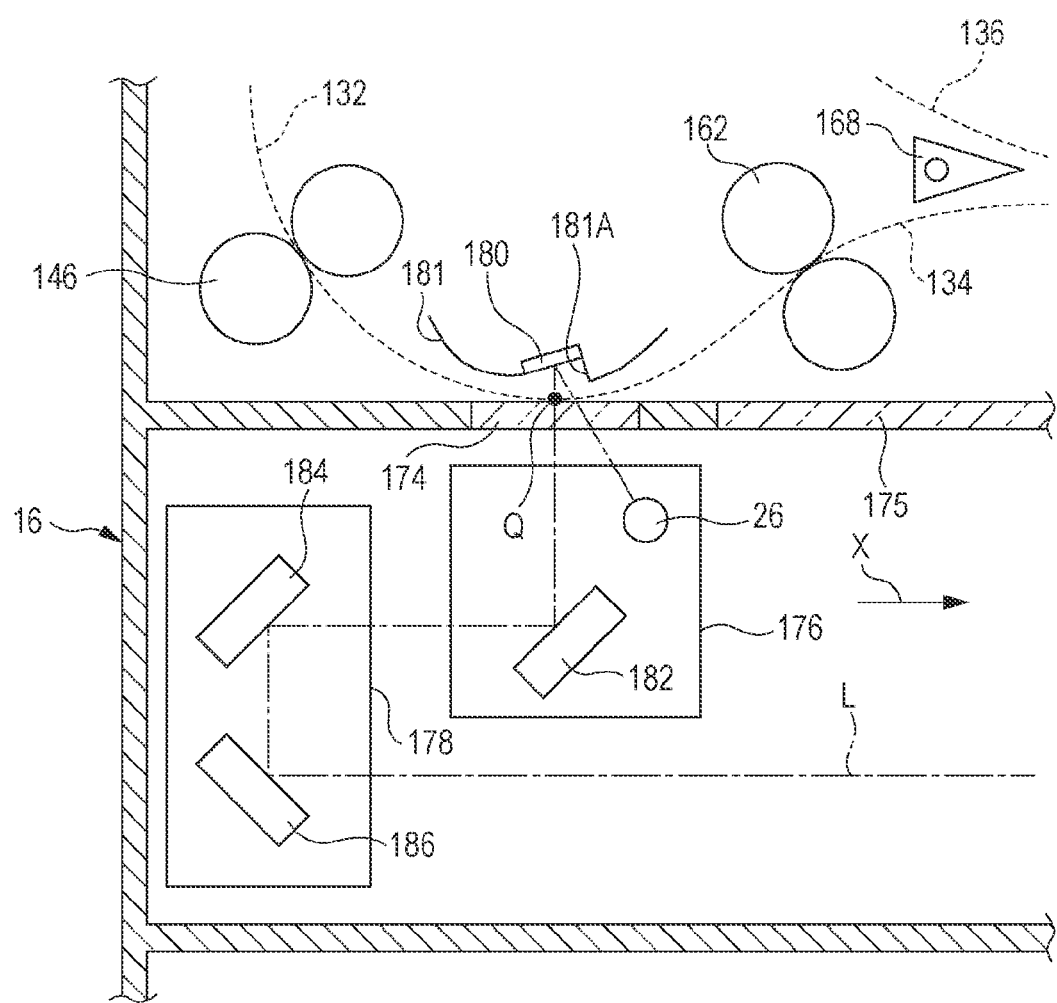
FIG. 5 is an enlarged cross-sectional view of the image reading section according to the first exemplary embodiment of the present invention.

Referring to FIGS. 4, 5, and 6, the image reading section 16 includes a transporter 22 as an example of a transport unit that transports a document G having an image formed thereon to an image reading position Q, the aforementioned registration-roller driver 24 as an example of a first correcting unit that is provided upstream of the reading position Q in the transport direction of the document G and that corrects a skew of the document G by coming into contact with the leading edge of the document G, and a lamp 26 as an example of a radiating unit that radiates light to the document G at the reading position Q.

The image reading section 16 also includes an image-data input unit 28 as an example of an image-information acquiring unit, a reflector plate 180 as an example of a reflecting unit, a leading-edge detector 30 as an example of a leading-edge detecting unit, a skew-amount calculator 31 as an example of a skew-amount calculating unit, the aforementioned image processor 32 as an example of a second correcting unit, and the aforementioned controller 20 as an example of a switching unit that switches between a skew correction method by the registration-roller driver 24 and a skew correction method by the image processor 32 on the basis of document information, to be described later, a skew amount of the leading edge of the document G calculated by the skew-amount calculator 31, or user's selection. Detailed descriptions of the image-data input unit 28, the reflector plate 180, the leading-edge detector 30, the skew-amount calculator 31, and the image processor 32 will be provided later.

As shown in FIG. 4, the transporter 22 includes a first transport path 132 along which the document G is transported from the document tray 19A to the reading position Q, a second transport path 134 along which the document G is transported from the reading position Q to the output tray 19B, a third transport path 136 that is connected to the first transport path 132 and the second transport path 134 and turns over the document G, and multiple rollers, to be described later, for transporting the document G.

The first transport path 132 is provided with a pickup roller 138, a feed roller 142, a pre-registration roller 144, and a registration roller 146, which are rotatable and are arranged in the above order toward the downstream side in the transport direction of the document G. These rollers are rotated or stopped in accordance with control by the controller 20 (see FIG. 6). In the following description, the downstream side and the upstream side in the transport direction of the document G may sometimes be simply referred to as "downstream side" and "upstream side", respectively.

During standby, the pickup roller 138 is lifted so as to be maintained at a retreated position. When transporting a document G, the pickup roller 138 is lowered to a document transport position so as to transport an uppermost document G on the document tray 19A toward the downstream side. The feed roller 142 is constituted of a pair of rollers that transport the document G downstream.

The pre-registration roller 144 is constituted of a pair of rollers included in the registration-roller driver (see FIG. 6), and temporarily stops the document G transported from the feed roller 142 so as to form a loop (i.e., curved area) in the document G, thereby correcting a skew of the document G. A skew (i.e., a skew of the leading edge) occurring as the document G is transported during a reading process is suppressed by this loop formed in the document G, whereby a positioning adjustment function is enhanced.

Specifically, when the leading edge of the document G is detected by a pre-registration sensor 156, to be described later, a timer (not shown) in the controller 20 (see FIG. 6) is activated. This timer measures a preset time period from a time point at which a loop is formed in the document G due to the leading edge of the document G coming into contact with the pre-registration roller 144 to a time point at which a skew of the document G is corrected. When the preset time period has elapsed, the pre-registration roller 144 rotates so as to transport the document G, whereby the document G having undergone skew correction is transported to the registration roller 146.

The registration roller 146 is constituted of a pair of rollers included in the registration-roller driver 24 (see FIG. 6), and rotates at a preset timing so as to adjust the registration (position) of the leading edge of the document G relative to the reading position Q before supplying the document G to the reading position Q. Specifically, in the transporter 22, the skew of the leading edge of the document G is corrected by the pre-registration roller 144, and the position of the leading edge of the document G is corrected by the registration roller 146.

Furthermore, the first transport path 132 is provided with a set sensor 152, a fade-out sensor 154, the aforementioned pre-registration sensor 156, a document-size sensor 158, and a registration sensor 160 as an example of an upstream-side detector.

The set sensor 152 is disposed facing the first transport path 132 between the pickup roller 138 and the feed roller 142. The fade-out sensor 154 is disposed facing the first transport path 132 at the downstream side of the feed roller 142. The pre-registration sensor 156 is disposed facing the first transport path 132 at the downstream side of the fade-out sensor 154 and at the upstream side of the pre-registration roller 144.

The document-size sensor 158 is disposed facing the first transport path 132 at the downstream side of the pre-registration roller 144. The registration sensor 160 is disposed facing the first transport path 132 at the downstream side of the document-size sensor 158 and at the upstream side of the registration roller 146.

The registration sensor 160 is, for example, a contact-type sensor. Specifically, the registration sensor 160 includes a tiltable lever that protrudes onto the first transport path 132, and is provided with an optical detector within the movable range of the lever. When the leading edge of the document G comes into contact with the lever, the lever moves toward the detector and blocks light, whereby the registration sensor 160 detects the leading edge of the document G.

The second transport path 134 is provided with an outward roller 162 and an output roller 164 that are rotatable and are arranged in the above order toward the downstream side. These rollers are rotated or stopped in accordance with control by the controller 20 (see FIG. 6). An inversion sensor 166 is provided between the outward roller 162 and the output roller 164.

The outward roller 162 is constituted of a pair of rollers and transports the document G, from which the image has been read at the reading position Q, toward the downstream side. The output roller 164 is constituted of a pair of rollers and outputs the document G transported by the outward roller 162 onto the output tray 19B. If the document G is to be turned over, the output roller 164 rotates in a direction opposite to that when the document G is output, while holding the trailing edge of the document G.

The third transport path 136 is provided above the second transport path 134, and has a first end connected to the upstream side of the output roller 164 and a second end connected to the upstream side of the pre-registration sensor 156. A switch gate 168 is tiltably provided at a branch point between the second transport path 134 and the third transport path 136. The switch gate 168 is triangular-prism-shaped, and a part thereof with the smallest apex angle extends toward the output roller 164. This part moves toward the second transport path 134 so as to guide the document G to the third transport path 136, or moves toward the third transport path 136 so as to guide the document G to the output roller 164.

The inversion sensor 166 is disposed at the downstream side of the outward roller 162 and at the upstream side of the switch gate 168, and detects that the trailing edge of the document G has passed. When a preset time period has elapsed after the inversion sensor 166 detects that the trailing edge of the document G has passed, the controller (see FIG. 6) makes the switch gate 168 move toward the second transport path 134 and rotates the output roller 164 in the direction opposite to that when the document G is output, thereby sending the trailing edge of the document G into the third transport path 136. Thus, the document G enters the first transport path 132 again starting from the trailing edge. Then, after an image is read from the surface of the document G opposite the first read surface, the document G is output onto the output tray 19B.

An area of the document tray 19A on which documents G are placed (denoted by a double-dashed chain line as an example) is provided with optical (reflective) document-size sensors 172A, 172B, and 172C arranged in the sub scanning direction (i.e., transport direction). The document-size sensors 172A, 172B, and 172C are arranged with a certain distance therebetween in that order from the pickup roller 138.

The document tray 19A is also provided with multiple document-size sensors (not shown) in the main scanning direction (Y direction). These document-size sensors arranged in the main scanning direction are optical sensors and detect the width of the documents G in the main scanning direction by being turned on or off. The size of the documents G is determined on the basis of an output from the document-size sensors arranged in the main scanning direction and an output from the document-size sensors 172A, 172B, and 172C arranged in the sub scanning direction.

The reading position Q is provided with a first platen glass member 174 on which a transported document G is placed.

The first platen glass member 174 serves as a light transmission portion for reading an image from the transported document G. Furthermore, a second platen glass member 175 on which a document G is placed in a stationary state is provided below the output tray 19B. The upper surface of the second platen glass member 175 is aligned with the upper surface of the first platen glass member 174.

Referring to FIG. 5, a full rate carriage 176 and a half rate carriage 178 that are movable in the X direction are provided below the first platen glass member 174 and the second platen glass member 175. In FIG. 5, the various sensors described above are not shown.

The aforementioned lamp 26 that radiates light to the document G (see FIG. 4) and a first mirror 182 that receives reflected light obtained from the document G are provided within the full rate carriage 176. The full rate carriage 176 reads an image by staying below the first platen glass member 174 or by moving in the X direction to scan across the entire second platen glass member 175.

A second mirror 184 and a third mirror 186 that supplies light L obtained from the first mirror 182 to an imaging unit, to be described later, are provided within the half rate carriage 178. The half rate carriage 178 supplies the light L (denoted by a dot-dash line) obtained from the full rate carriage 176 to the imaging unit. In the following description, the light L may sometimes be called "reflected light L" or "light path L".

The aforementioned reflector plate 180 that reflects the light L (referred to as "regular reflected light") radiated from the lamp 26 directly to the first mirror 182 is provided above the reading position Q (i.e., at a position opposite the lamp 26 and the first mirror 182 with the document G interposed therebetween at the reading position Q). By using an adhesive or the like, the reflector plate 180 is fixed within a recess 181A formed in the lower surface of a stationary member 181 fixed above the reading position Q, such that the reflective surface of the reflector plate 180 is exposed toward the reading position Q.

As shown in FIG. 4, an imaging lens 188 that optically demagnifies an optical image obtained from the third mirror 186 and a charge-coupled-device (CCD) image sensor 190 that performs photoelectric conversion on the optical image formed by the imaging lens 188 are provided at the X-direction side on the light path L. The CCD image sensor 190 constitutes a part of the image-data input unit 28 (see FIG. 6). The CCD image sensor 190 converts an optical signal into image information (image data).

Specifically, the CCD image sensor 190 is provided in correspondence with different spectral sensitivities, generates image signals in accordance with the quantities of light received by individual light-receiving elements (not shown), and outputs the image signals to a subsequent stage. In other words, the CCD image sensor 190 generates red (R), green (G), and blue (B) image signals by performing photoelectric conversion on the optical image formed by the imaging lens 188, and outputs the image signals to the subsequent stage.

If an image is to be read from a document G placed on the second platen glass member 175, the full rate carriage 176 and the half rate carriage 178 move in the X direction at a ratio of 2:1 (i.e., a ratio of moving distances thereof). In this case, the lamp 26 radiates light onto the surface of the document G to be read, and the reflected light L from the document G is reflected by the first mirror 182, the second mirror 184, and the third mirror 186 in that order before being guided to the imaging lens 188.

The light L guided to the imaging lens 188 forms an image on a light-receiving surface of the CCD image sensor 190. Then, the CCD image sensor 190 simultaneously processes the light L corresponding to one line. When one line in the line direction (i.e., the main scanning direction, which is the Y direction) is completely read, the full rate carriage 176 is moved in a direction (i.e., the sub scanning direction, which is the X direction) substantially orthogonal to the main scanning direction so that the subsequent line of the document G is read. By performing this process across the entire document G, the reading process for one page of the document G is completed.

The first platen glass member 174 is formed of, for example, a transparent glass plate having a long plate-like structure. A document G transported by the transporter 22 travels over the first platen glass member 174. In this case, the full rate carriage 176 and the half rate carriage 178 are in a stopped state. In this stopped state, the light L corresponding to the first line of the document G and reflected from the document G travels via the first mirror 182, the second mirror 184, and the third mirror 186 so as to form an image at the imaging lens 188, and the image is subsequently read by the CCD image sensor 190. Specifically, after one line in the main scanning direction is simultaneously processed by the CCD image sensor 190, the next line in the main scanning direction is read.

Referring to FIG. 6, the aforementioned controller 20, the registration-roller driver 24, the image-data input unit 28, the leading-edge detector 30, the image processor 32, and the image-data output unit 33 are provided within the image forming apparatus 10 (i.e., within the image reading section 16).

The image-data input unit 28 includes the aforementioned CCD image sensor 190 (see FIG. 4). The image-data input unit 28 receives the light L reflected from the document G and acquires information (image data) of the image formed on the document G on the basis of information of the received light L. Then, the image data acquired by the image-data input unit 28 is sent to the image processor 32. The image data acquired by the image-data input unit 28 and data regarding the quantity of light received by the CCD image sensor 190 are sent to the leading-edge detector 30.

Referring to FIG. 4, the leading-edge detector 30 detects the leading edge of the document G on the basis of the quantity of light received by the CCD image sensor 190. Specifically, when an automatic reading process for the document G is performed, the leading-edge detector 30 detects the leading edge of the document G passing through the reading position Q by comparing the quantity of reflected light L directly reflected by the reflector plate 180 when there is no document G at the reading position Q with the quantity of reflected light L reflected by the document G that has reached the reading position Q.

The light L (radiated light) from the lamp 26 tends to be irregularly reflected due to, for example, fine protrusions and recesses on the surface of the document G caused by fibers or the like in the paper, the step at the leading edge thereof, and defects. Therefore, the quantity of light reflected by the document G and detected by the CCD image sensor 190 becomes smaller than the quantity of light directly reflected by the reflector plate 180 and detected by the CCD image sensor 190.

For the leading-edge detector 30, a value larger than the quantity of light reflected from the document G but smaller than the quantity of light directly reflected from the reflector plate 180 is set (stored) as a reference light quantity. If the value of the total quantity of light received by the pixels in the CCD image sensor 190 is larger than the reference light quantity, the leading-edge detector 30 determines that there is no document G at the reading position Q. If the value of the total quantity of received light is smaller than the reference light quantity, the leading-edge detector 30 determines that there is a document G at the reading position Q.

Accordingly, the leading-edge detector 30 determines that the leading edge of a document G (i.e., front end in the transport direction) has passed the reading position Q when a state where there is no document G at the reading position Q changes to a state where there is a document G at the reading position Q. Furthermore, the leading-edge detector 30 determines that the trailing edge of a document G has passed the reading position Q when a state where there is a document G at the reading position Q changes to a state where there is no document G at the reading position Q. With regard to a document G traveling through the reading position Q, the leading-edge detector 30 is capable of detecting positions where pixels thereof facing the document G change to pixels thereof not facing the document G as edges of the document G in the widthwise direction (Y direction).

The skew-amount calculator 31 calculates a skew amount of the leading edge of the document G detected by the leading-edge detector 30, and sends the obtained skew-amount data of the leading edge of the document G to the image processor 32. A method for detecting a skew of the leading edge of the document G (i.e., skew-amount calculation method) will be described later.

As shown in FIG. 6, the image processor 32 manages the image data acquired from the image-data input unit 28 on two-dimensional coordinate axes, and corrects a skew of (i.e., rotates) the image information acquired by the image-data input unit 28 on the basis of the skew amount (detected angle) of the leading edge of the document G calculated by the skew-amount calculator 31. Then, the image processor 32 sends the rotated image data to the image-data output unit 33.

The image-data output unit 33 sends the image data rotated by the image processor 32 to a subsequent stage (i.e., the exposure unit 70 (see FIG. 1)) in synchronization with a page synchronization signal and a line synchronization signal.

The registration-roller driver 24 includes the pre-registration roller 144, the registration roller 146, and a motor and a gear (not shown) for rotationally driving the pre-registration roller 144 and the registration roller 146. The operation of the registration-roller driver 24 is controlled by the controller 20, so that a skew correction process, to be described below, is performed on the document G. The controller 20 will be described later.

Skew Correction Method for Document G by using Registration-Roller Driver 24

Figure 7A:
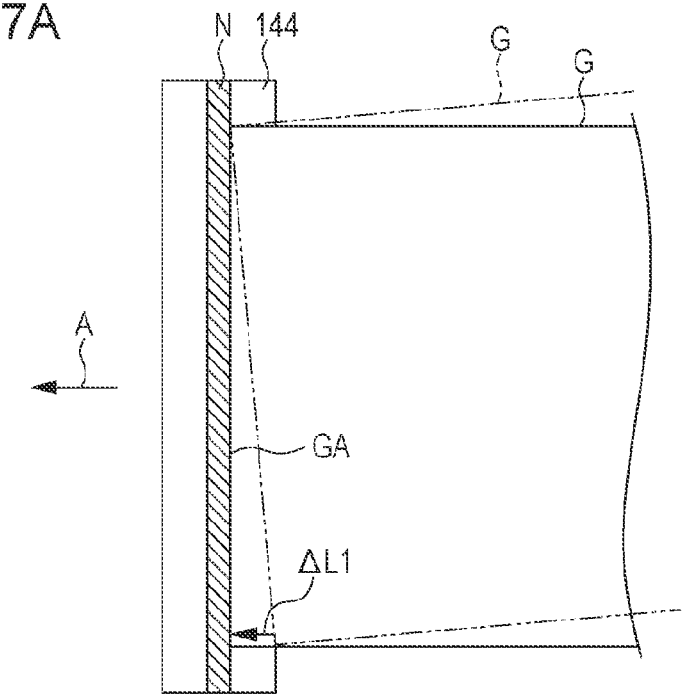
FIG. 7A schematically illustrates how a skew of a document (image) is corrected based on a registration-roller method according to the first exemplary embodiment of the present invention, and FIG. 7B schematically illustrates how a skew of a document is corrected based on a registration-roller less method according to the first exemplary embodiment of the present invention.

Referring to FIG. 7A, when a document G forms a loop, the document G (denoted by a double-dashed chain line), which is skewed relative to the transport direction A and transported to a nip N of the pre-registration roller 144, receives a force that eliminates the loop. Therefore, a leading edge GA of the document G (denoted by a solid line) comes into contact with the pre-registration roller 144 in the longitudinal direction of the nip N (i.e., along the rotation axis of the pre-registration roller 144). Consequently, misregistration (corresponding to a distance $\Delta L1$), in the transport direction A, between the widthwise ends of the leading edge GA is eliminated, whereby the skew of the document G is corrected.

In the following description, the skew correction method for the document G by using the registration-roller driver 24 will be referred to as "registration-roller method".

Skew Correction Method for Document G by using Image Processor 32

Figure 7B:
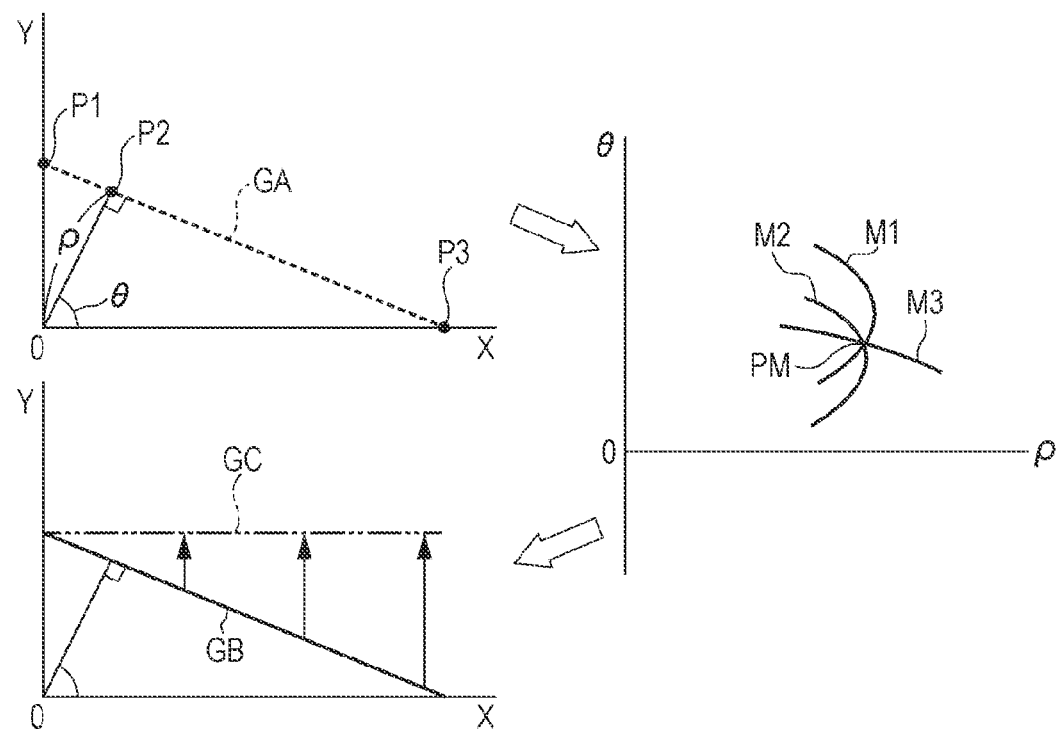

Referring to an upper left graph in FIG. 7B, image data for points P1, P2, and P3 on the leading edge GA of the document G are acquired by the leading-edge detector 30 (see FIG. 6) on an X-Y coordinate system. Assuming that the leading edge GA is defined as a straight line y=aX+b, and a line perpendicular to this straight line is drawn from the point of origin, the expression ρ=X cos θ+Y sin θ stands, where ρ denotes the length of the perpendicular line, and θ denotes an angle formed between the perpendicular line and the X axis.

Then, as shown in a right graph in FIG. 7B, when the points P1, P2, and P3 are expressed in a ρ-θ coordinate system, curve lines M1, M2, and M3 are obtained. If there is a point PM where the curve lines M1, M2, and M3 intersect, the point PM is brought back to the X-Y coordinate system.

Subsequently, as shown in the right graph and a lower left graph in FIG. 7B, the point PM in the ρ-θ coordinate system is expressed as a straight line GB in the X-Y coordinate system. The straight line GB is a straight line on which the points P1, P2, and P3 exist. The inclination of the straight line GB corresponds to the skew of the leading edge of the document G (i.e., skew of the image). By using Hough transformation in this manner, the skew (detected angle) of the document G can be obtained.

As shown in FIGS. 6 and 7B, based on the detected angle of the leading edge GA of the document G obtained by the leading-edge detector 30, the image processor 32 corrects the skew of the document G by rotating the input image so that the detected angle becomes zero. A double-dashed chain line GC in FIG. 7B denotes the leading edge of the document G after the skew correction. An example of a technique for rotating the image includes a known affine transformation technique.

In the following description, the skew correction method for the document G by using the image processor 32 will be referred to as "registration-roller less method".

The controller 20 shown in FIG. 6 switches between the registration-roller driver 24 (registration-roller method) and the image processor 32 (registration-roller less method) on the basis of at least one of the document information, the detection result of the leading-edge detector 30, selection made by the user (by using the selection keys 17C (see FIG. 3), and mode selection, to be described later. In the first exemplary embodiment, the controller 20 switches between the registration-roller method and the registration-roller less method on the basis of the document information and the mode selection. If the registration-roller method is to be selected when the registration-roller method is already set, or if the registration-roller less method is to be selected when the registration-roller less method is already set, the expression "switch" will still be used. This similarly applies to subsequent exemplary embodiments. Each of the modes will be described later.

The document information is information for distinguishing whether the document G is an ordinary document or another type of document. In the first exemplary embodiment, an ordinary document and another type of document are distinguished from each other by, for example, the material of the document G. Specifically, an ordinary document is set as a normal-paper document, whereas another type of document is set as a thin-paper document thicker than normal paper. The controller 20 uses the image processor 32 when an ordinary document is to be read, and uses the registration-roller driver 24 when another type of document is to be read.

Figure 9A:
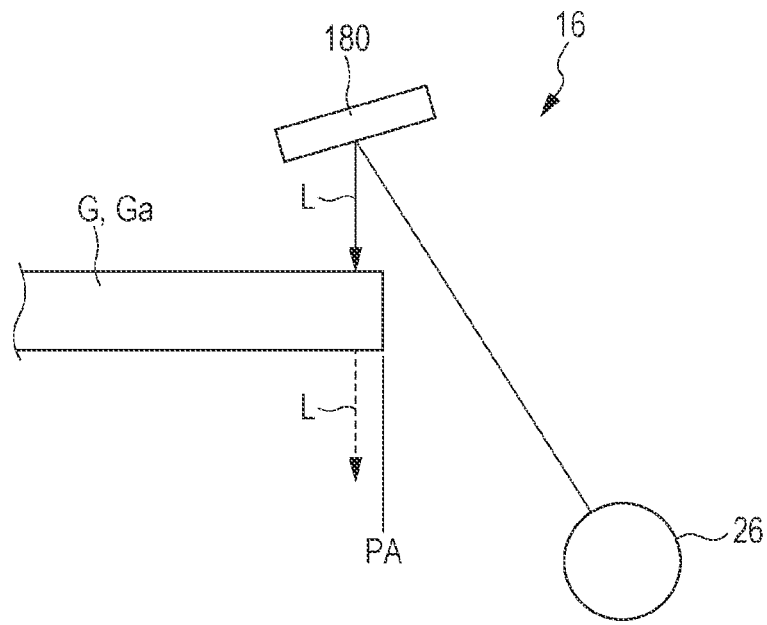
FIG. 9A schematically illustrates a state where the position of a leading edge of an ordinary document is detected in the image reading section according to the first exemplary embodiment of the present invention, and FIG. 9B schematically illustrates a state where the position of a leading edge of another type of document (thin paper) is detected in the image reading section according to the first exemplary embodiment of the present invention.

Referring to FIG. 9A, when the document G is normal paper Ga, the normal paper Ga transmits a relatively small quantity of the light L (denoted by a solid line) reflected by the reflector plate 180 (this state is denoted by a dash line L). Therefore, when the document G formed of normal paper Ga is transported to the reading position Q (see FIG. 4), there is a large difference (contrast) in the quantity of light received by the CCD image sensor 190 (see FIG. 4) between when the document G is present above the reading position Q and when the document G is not present above the reading position Q. Thus, a leading-edge position PA of the document G is accurately detected by the leading-edge detector 30 (see FIG. 6).

Figure 9B:
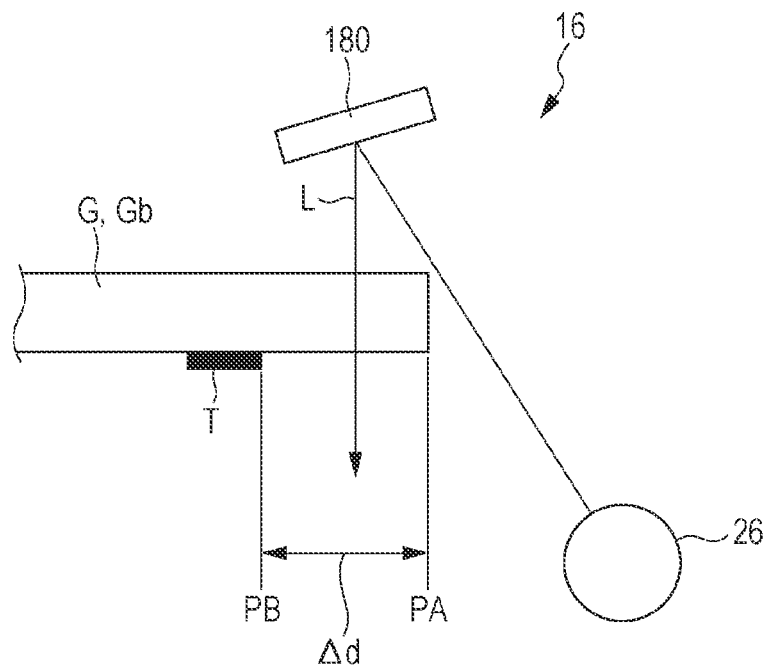

Referring to FIG. 9B, when the document G is thin paper Gb, the thin paper Gb transmits a large quantity of the light L (denoted by a solid line) reflected by the reflector plate 180. Therefore, when the document G formed of thin paper Gb is transported to the reading position Q, there is a small difference (contrast) in the quantity of light received by the CCD image sensor 190 (see FIG. 4) between when the document G is present above the reading position Q and when the document G is not present above the reading position Q. Thus, the accuracy for detecting the leading-edge position PA of the document G is lowered (i.e., an error increases).

For example, in the case where the document G is formed of thin paper Gb, assuming that an area where there is a large difference in the quantity of light received by the CCD image sensor 190 due to blocked reflected light L is an area with a toner T (denoted by a black rectangle) adhered thereto, there is a possibility that an edge of the toner T may be erroneously detected as a leading-edge position PB. In this case, misregistration corresponding to a distance Δd occurs between the leading-edge position PA and the leading-edge position PB.

The controller 20 shown in FIG. 6 has a reading-period priority mode for prioritizing the reduction of the reading period for the document G over other conditions. In the reading-period priority mode, the image processor 32 is set to be used if the document information of the document G is not selected by the user (by using the selection keys 17C (see FIG. 3)).

Furthermore, the controller 20 has a reading-accuracy priority mode for prioritizing the reading accuracy of the document G. In the reading-accuracy priority mode, the registration-roller driver 24 is set to be used if the document information of the document G is not selected by the user (by using the selection keys 17C (see FIG. 3)). The reading accuracy of the document G corresponds to the degree of reliability of skew correction (that is, for example, the leading edge of the document G can be reliably detected if formed of normal paper, but the leading edge of the document G may sometimes be difficult to detect if formed of thin paper).

Operation

Next, the operation according to the first exemplary embodiment will be described.

The operation in the image reading section 16 according to the first exemplary embodiment will now be described with reference to a flowchart shown in FIG. 8. The units and components constituting the image reading section 16 are those shown in FIGS. 3 to 6, and figure numbers corresponding thereto will be omitted in the following description.

In step S10, the display panel 17A displays a message for confirming whether or not the user desires to select the reading-period priority mode. If the user selects the reading-period priority mode via the display panel 17A or the key input portion 17B, the operation proceeds to step S12. On the other hand, if the user makes a selection via the display panel 17A or the key input portion 17B so as not to use the reading-period priority mode, the operation proceeds to step S14.

Then, in step S12, if the user selects a read start command for the document G via the display panel 17A or the key input portion 17B without selecting the type of document G (ordinary document or another type of document), or if a preset time period elapses after the controller 20 makes the display panel 17A display a message for prompting the user to make a selection (i.e., select the type of document G), the operation proceeds to step S26. On the other hand, if the type of document G is selected by the user, the operation proceeds to step S20.

Subsequently, if the user selects an ordinary document in step S20, the operation proceeds to step S26. On the other hand, if the user selects another type of document instead of an ordinary document, the operation proceeds to step S28.

In step S26, the ordinary document (normal paper in this case) is read based on the registration-roller less method, and positional adjustment and skew adjustment are performed thereon. In the registration-roller less method, the transported ordinary document is temporarily stopped by the pre-registration roller 144, but is not temporarily stopped by the registration roller 146, so that the reading period for the ordinary document may be shortened, as compared with a case where the transported ordinary document is temporarily stopped by both the pre-registration roller 144 and the registration roller 146. Furthermore, since the stopping and reactivation of the pre-registration roller 144 and the registration roller 146 are not performed, loud operating noise (driving noise) during the transport process of the ordinary document may be suppressed.

Furthermore, since only the ordinary document is read in step S26, the reflected light from the reflector plate 180 is less likely to be transmitted through the ordinary document. Thus, a detection error of the leading-edge position of the ordinary document at the reading position Q is less likely to occur even with the registration-roller less method.

In step S28, another type of document (thin paper in this case) is read, and positional adjustment and skew adjustment are performed thereon. In the registration-roller method, the positional adjustment and the skew adjustment are performed by bringing the leading edge of the document into contact with the pre-registration roller 144 and the registration roller 146, so that the accuracy of positional adjustment and skew adjustment for the document may be increased, as compared with a case where the positional adjustment and the skew adjustment are performed by detecting the leading edge of the document in a non-contact manner.

Next, in step S14, the display panel 17A displays a message for confirming whether or not the user desires to select the reading-accuracy priority mode. If the user selects the reading-accuracy priority mode via the display panel 17A or the key input portion 17B, the operation proceeds to step S16. On the other hand, if the user makes a selection via the display panel 17A or the key input portion 17B so as not to use the reading-accuracy priority mode, the operation proceeds to step S18.

Then, in step S16, if the user selects a read start command for the document G via the operation panel 17 without selecting the type of document G (ordinary document or another type of document), or if the preset time period elapses after the controller 20 makes the display panel 17A display the message for prompting the user to make a selection (i.e., select the type of document G), the operation proceeds to step S28. On the other hand, if the type of document G is selected by the user, the operation proceeds to step S22.

Subsequently, if the user selects an ordinary document in step S22, the operation proceeds to step S26. On the other hand, if the user selects another type of document instead of an ordinary document, the operation proceeds to step S28.

In step S28, the accuracy of positional adjustment and skew adjustment for the document may be increased due to the registration-roller method, as described above, so that the reading accuracy may be increased.

Next, in step S18, the display panel 17A displays the message for prompting the user to select the type of document G. When the type of document G is selected by the user, the operation proceeds to step S24. On the other hand, if the type of document G is not selected by the user, the display panel 17A continues to display the message for prompting the user to select the type of document G until the user selects the type of document G.

Subsequently, when the user selects an ordinary document in step S24, the operation proceeds to step S26. On the other hand, if the user selects another type of document instead of an ordinary document, the operation proceeds to step S28. Since the effects of steps S26 and S28 are the same, descriptions thereof will be omitted.

Accordingly, in the image reading section 16 according to the first exemplary embodiment, operating noise during the transport process of the document G may be reduced or the accuracy of skew correction of an image (document) may be improved in accordance with the document information or user's selection. Specifically, operating noise may be reduced when reading an ordinary document, and the accuracy of image skew correction may be improved when reading another type of document. Furthermore, in the reading-period priority mode, the skew correction is performed by reading the document G within a short period of time. In the reading-accuracy priority mode, the reading accuracy of the document G may be improved.

Second Exemplary Embodiment

Next, an image reading device and an image forming apparatus according to a second exemplary embodiment of the present invention will be described. Components and parts that are basically the same as those in the image reading section 16 and the image forming apparatus 10 according to the first exemplary embodiment described above (the term "same" includes similar components with partially different shapes) are given the same reference numerals or characters as in the first exemplary embodiment, and descriptions thereof will be omitted.

Referring to FIG. 6, in the image reading section 16 according to the second exemplary embodiment, the controller 20 has a reading mode (referred to as "provisional reading mode") in which the controller 20 transports at least one document G to the reading position Q so as to provisionally read an image therefrom, makes the leading-edge detector 30 detect the leading edge of the document G, and switches between the registration-roller driver 24 and the image processor 32 on the basis of the detection result of the leading-edge detector 30. In the provisional reading mode, if the leading edge of the document G can be detected by the leading-edge detector 30, the registration-roller less method is used for the remaining documents G, whereas if the leading edge of the document G cannot be detected by the leading-edge detector 30, the registration-roller method is used for the remaining documents G. The remaining documents G are not only directed to documents G that have not been provisionally read, but also include documents G that have been provisionally read. In this case, all documents G including those that have been provisionally read are to be read again.

Referring to FIG. 4, in the second exemplary embodiment, with regard to a time period $t1=L1/V$ that it takes for the leading edge of the document G to reach the reading position Q from the start of the transport process, $t1+\alpha$ is set as a reference time period, where V denotes the transport speed of the document G transported by predetermined rollers of the transporter 22, L1 denotes the distance of a transport path extending from the pickup roller 138 to the reading position Q, and $\alpha$ denotes a permissible measurement error. If the time period that it takes to detect the leading edge of the document G at the reading position Q from the start of the transport process of the document G is shorter than or equal to the reference time period, the leading-edge detector 30 determines that the leading edge of the document G has been detected.

Operation

Next, the operation according to the second exemplary embodiment will be described.

Figure 10:
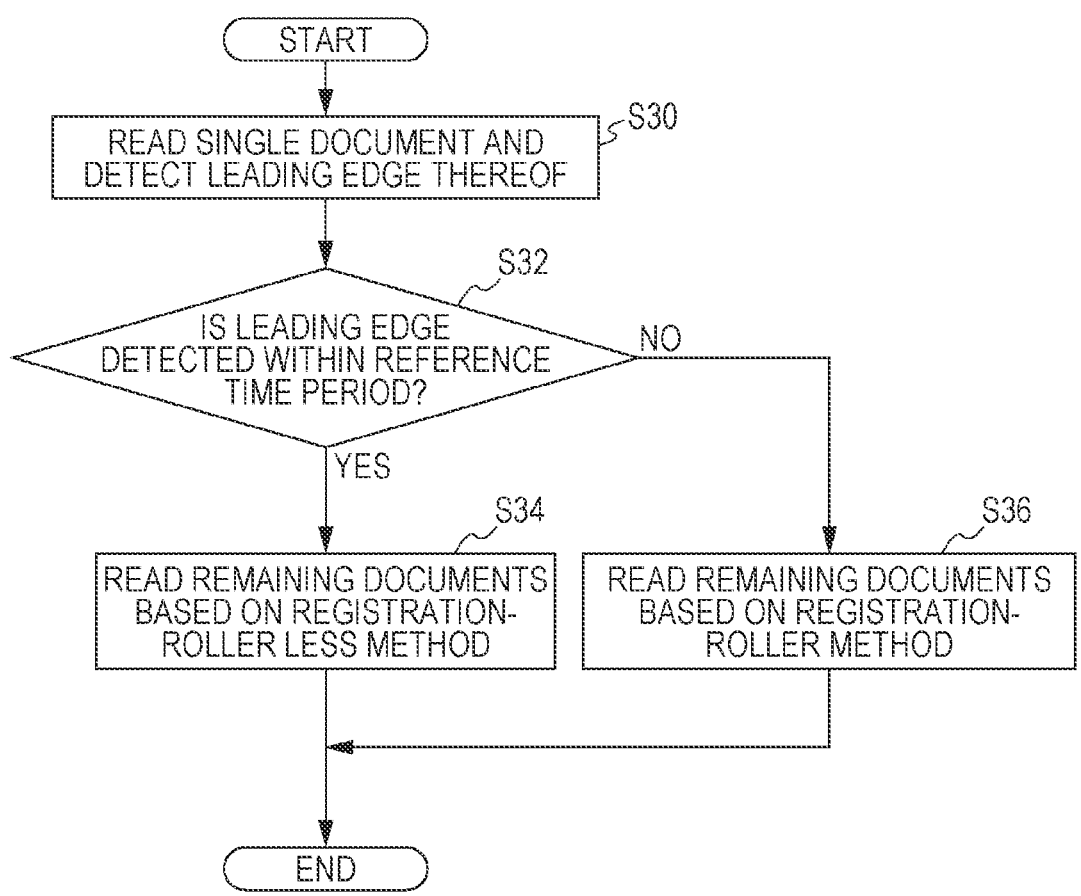
FIG. 10 is a flowchart illustrating a procedure for switching between the registration-roller method and the registration-roller less method in an image forming apparatus according to a second exemplary embodiment of the present invention.

The operation in the image reading section 16 according to the second exemplary embodiment will now be described with reference to a flowchart shown in FIG. 10. The units and components constituting the image reading section 16 are those shown in FIGS. 3 to 6, and figure numbers corresponding thereto will be omitted in the following description.

In step S30, the user sets multiple documents G on the document tray 19A. Then, when the user presses the read start button 17E in the key input portion 17B, the reading process commences based on the registration-roller less method, and only the uppermost document G is transported. The operation then proceeds to step S32.

Subsequently, in step S32, if the time period that it takes to detect the leading edge of the document G at the reading position Q from the start of the transport process is within the reference time period, the operation proceeds to step S34 where the remaining documents G on the document tray 19A are read based on the registration-roller less method. Consequently, documents G whose leading edges are misregistered at the reading position Q (i.e., documents G that are outside the reference time period) are removed, so that skewing and misregistration of the leading edges of documents G are suppressed even if the documents G are read based on the registration-roller less method.

In step S32, if the time period that it takes to detect the leading edge of the document G at the reading position Q from the start of the transport process is longer than the reference time period, the operation proceeds to step S36 where the controller 20 switches the skew correction method to the registration-roller method. Then, the remaining documents G on the document tray 19A (or all documents G including the single provisionally read document G) are read based on the registration-roller method.

As described above, in the registration-roller method, the positional adjustment and the skew adjustment are performed by bringing the leading edge of another type of document into contact with the pre-registration roller 144 and the registration roller 146. Thus, even if the leading edge of a document G tends to be misregistered at the reading position Q when the document G is read based on the registration-roller less method, the misregistration of the leading edge may be suppressed during the reading process. Furthermore, the accuracy of image skew correction may be improved, as compared with a configuration that performs the reading process based on the registration-roller less method without provisionally reading a document G. Moreover, operating noise may be reduced in the registration-roller less method, and the accuracy of image skew correction may be improved in the registration-roller method.

Third Exemplary Embodiment

Next, an image reading device and an image forming apparatus according to a third exemplary embodiment of the present invention will be described. Components and parts that are basically the same as those in the image reading section 16 and the image forming apparatus 10 according to the first exemplary embodiment described above (the term "same" includes similar components with partially different shapes) are given the same reference numerals or characters as in the first exemplary embodiment, and descriptions thereof will be omitted.

Referring to FIGS. 4 and 6, in the image reading section 16 according to the third exemplary embodiment, the aforementioned registration sensor 160 is provided at the upstream side of the reading position Q in the transport direction. The registration sensor 160 detects the leading edge of a document G that is being transported (or about to be transported) by the transporter 22.

The controller 20 is configured to obtain a time period $\Delta T = T1 - T0$, where T0 denotes a time point at which the leading edge of the document G is detected by the registration sensor 160, and T1 denotes a time point at which the leading edge of the document G detected by the registration sensor 160 is detected by the leading-edge detector 30. Then, if the obtained time period $\Delta T$ is shorter than a preset reference time period, the controller 20 determines that the leading edge of the document G has been detected, and switches the skew correction method to be used in the image reading process to the registration-roller less method. If the obtained time period $\Delta T$ is longer than or equal to the reference time period, the controller 20 switches the skew correction method to be used in the image reading process to the registration-roller method.

Furthermore, a second reference time period (referred to as "preset time period" hereinafter) that is shorter than the reference time period is set in the controller 20. If the time period $\Delta T$ is longer than the preset time period and is shorter than the reference time period, the controller 20 is configured to switch the skew correction method to be used in the image reading process to the registration-roller less method. Then, the image processor 32 is configured to correct the position of image information acquired by the image-data input unit 28 (see FIG. 6) (namely, shift the position of the image information to its original position) by an amount equivalent to a displacement amount (which is equivalent to, for example, the distance Ad in FIG. 9B) of the leading edge of the document G obtained on the basis of the time period $\Delta T$.

In the third exemplary embodiment, with regard to a time period $t2 = L2/V$ that it takes for the leading edge of the document G to reach the reading position Q from the registration sensor 160, $t2 + \alpha$ is set as the reference time period, where V denotes the transport speed of the document G transported by the rollers of the transporter 22, L2 denotes the distance of a transport path extending from the registration sensor 160 to the reading position Q, and $\alpha$ denotes a permissible measurement error. Furthermore, $t2 + \beta$ is set as the preset time period, where $\beta$ denotes a permissible measurement error that is a smaller value than the permissible measurement error $\alpha$.

Operation

Next, the operation according to the third exemplary embodiment will be described.

Figure 11:
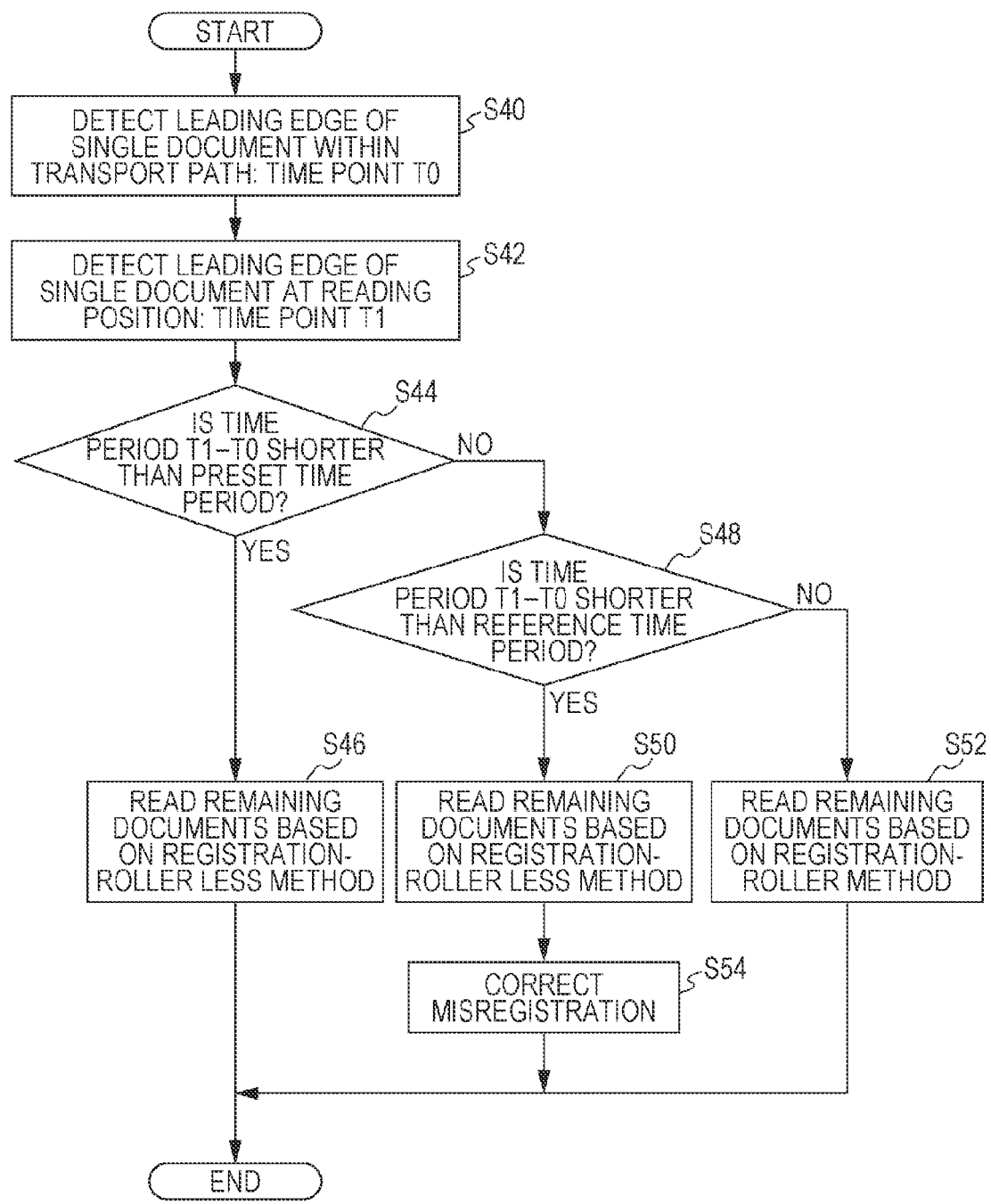
FIG. 11 is a flowchart illustrating a procedure for switching between the registration-roller method and the registration-roller less method in an image forming apparatus according to a third exemplary embodiment of the present invention.

The operation in the image reading section 16 according to the third exemplary embodiment will now be described with reference to a flowchart shown in FIG. 11. The units and components constituting the image reading section 16 are those shown in FIGS. 3 to 6, and figure numbers corresponding thereto will be omitted in the following description.

In step S40, when the user presses the read start button 17E on the operation panel 17, the reading process commences based on the registration-roller less method, and only the uppermost document G is transported. Then, a time point at which the leading edge of the document G is detected by the registration sensor 160 is set as T0, and the operation proceeds to step S42.

Subsequently, in step S42, a time point at which the leading edge of the document G is detected at the reading position Q is set as T1, and the operation proceeds to step S44.

Then, in step S44, if the time period $\Delta T = T1 - T0$ is shorter than (i.e., shorter than or equal to) the preset time period, the operation proceeds to step S46 where the remaining documents G (including the provisionally read document) are read based on the registration-roller less method. Consequently, documents G whose leading edges are misregistered at the reading position Q are removed, so that skewing and misregistration of the leading edges of documents G are suppressed even if the documents G are read based on the registration-roller less method.

In step S44, if the time period $\Delta T=T1-T0$ is longer than the preset time period, the operation proceeds to step S48.

Subsequently, in step S48, if the time period $\Delta T=T1-T0$ is shorter than (i.e., shorter than or equal to) the reference time period, the operation proceeds to step S50 where the remaining documents G (including the provisionally read document) are read based on the registration-roller less method. Consequently, documents G whose leading edges are misregistered at the reading position Q but could not be corrected based on the registration-roller less method are removed. The operation then proceeds to step S54.

Then, in step S54, the leading edge of each read document G is positionally shifted by an amount equivalent to the displacement amount (which is equivalent to, for example, the distance $\Delta d$ in FIG. 9B) of the leading edge of the document G, thereby correcting the leading-edge position. Consequently, image data with a small amount of misregistration at the leading edge is obtained.

In step S48, if the time period $\Delta T=T1-T0$ is longer than the reference time period, the operation proceeds to step S52 where the remaining documents G (including the provisionally read document) are read based on the registration-roller method. As described above, even if the leading edge of a document G tends to be misregistered at the reading position Q when the document G is read based on the registration-roller less method, the misregistration of the leading edge may be suppressed when the document G is read based on the registration-roller method. Moreover, operating noise may be reduced in the registration-roller less method, and the accuracy of image skew correction may be improved in the registration-roller method.

Fourth Exemplary Embodiment

Next, an image reading device and an image forming apparatus according to a fourth exemplary embodiment of the present invention will be described. Components and parts that are basically the same as those in the image reading section 16 and the image forming apparatus 10 according to the first exemplary embodiment described above (the term "same" includes similar components with partially different shapes) are given the same reference numerals or characters as in the first exemplary embodiment, and descriptions thereof will be omitted.

Figure 12:
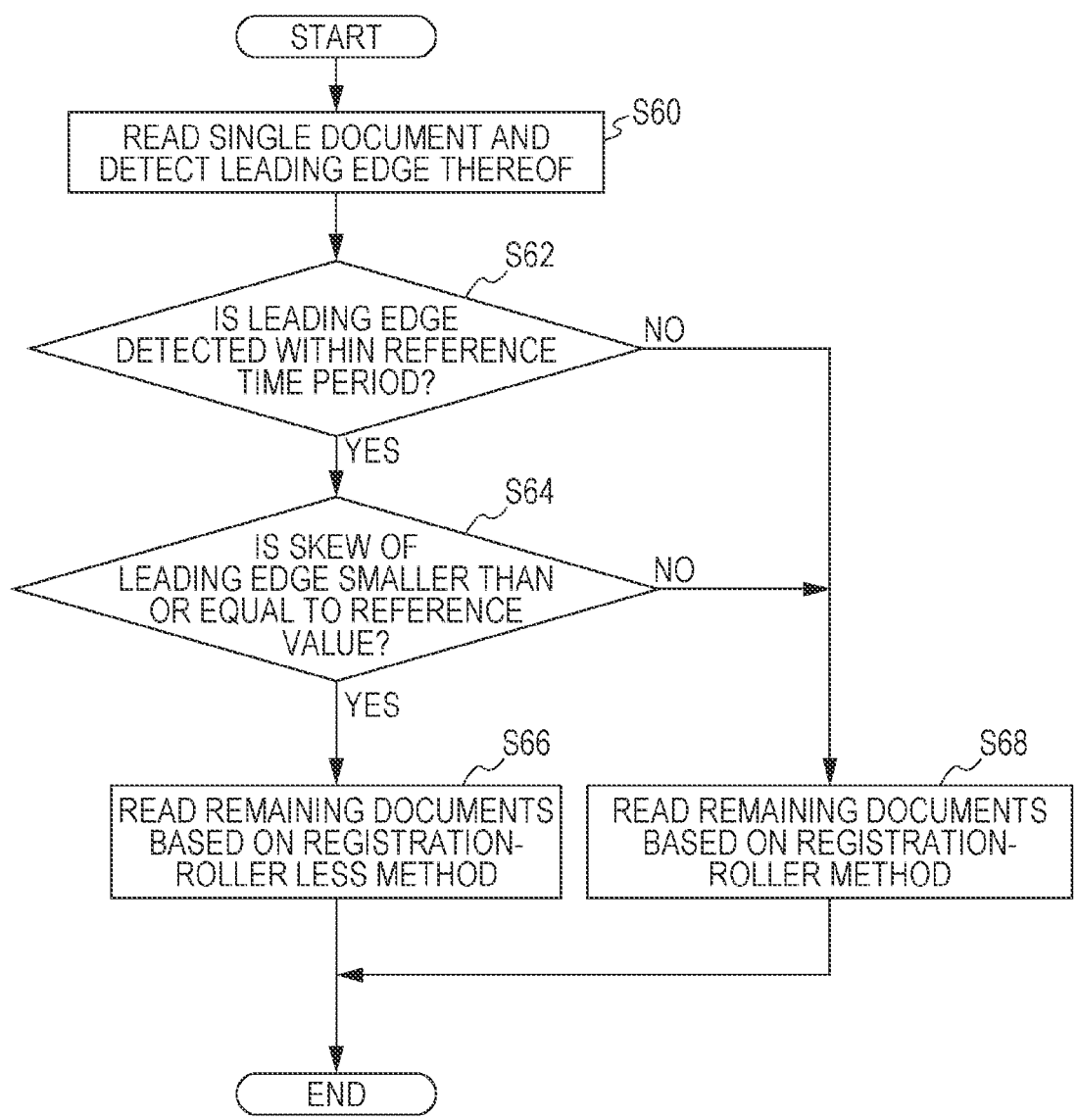
FIG. 12 is a flowchart illustrating a procedure for switching between the registration-roller method and the registration-roller less method in an image forming apparatus according to a fourth exemplary embodiment of the present invention.

Referring to FIGS. 4, 6, and 12, in the image reading section 16 according to the fourth exemplary embodiment, it is first confirmed whether the leading edge of a document G is detected at the reading position Q within a reference time period. Then, if the leading edge of the document G is detected, the skew-amount calculator 31 performs image processing (aforementioned Hough transformation) on read image information (image data) and calculates a skew amount of the leading edge of the document G. If the calculated skew amount of the leading edge of the document G is smaller than or equal to a reference value, the controller 20 determines that the leading edge of the document G has been detected, and switches the skew correction method to be used in the image reading process to the registration-roller less method.

Operation

Next, the operation according to the fourth exemplary embodiment will be described.

The operation in the image reading section 16 according to the fourth exemplary embodiment will now be described with reference to a flowchart shown in FIG. 12. The units and components constituting the image reading section 16 are those shown in FIGS. 3 to 6, and figure numbers corresponding thereto will be omitted in the following description.

In step S60, when the user presses the read start button 17E on the operation panel 17, the reading process commences based on the registration-roller less method, and only the uppermost document G is transported. Then, a time point at which the leading edge of the document G is detected by the registration sensor 160 is set as T0, and the operation proceeds to step S62.

Subsequently, in step S62, a time point at which the leading edge of the document G is detected at the reading position Q is set as T1, and if the time period $\Delta T=T1-T0$ is shorter than (i.e., shorter than or equal to) the reference time period t+$\alpha$, the operation proceeds to step S64. On the other hand, if the time period $\Delta T$ is longer than the reference time period t+$\alpha$, the operation proceeds to step S68 where the remaining documents G (including the provisionally read document) are read based on the registration-roller method.

In step S64, the leading-edge detector 30 determines a skew of the leading edge of the document G from image information read based on the aforementioned method. If the skew of the leading edge is smaller than or equal to a preset reference value (reference angle), the controller 20 determines that the leading edge of the document G has been detected, and the operation proceeds to step S66 where the remaining documents G (including the provisionally read document) are read based on the registration-roller less method.

On the other hand, in step S64, if the skew of the leading edge of the document G is larger than the reference value (reference angle), the controller 20 determines that the leading edge of the document G could not be detected, and the operation proceeds to step S68 where the remaining documents G (including the provisionally read document) are read based on the registration-roller method. Consequently, documents G whose leading edges are skewed by a large amount are read based on the registration-roller method so that the accuracy of skew correction may be improved. Furthermore, documents G whose leading edges are skewed by a small amount are read based on the registration-roller less method, so that the skew of the documents G can be corrected. In this case, when performing the skew correction, since the leading edges of the documents G are skewed by a small amount, the load on the image processor 32 for the correcting process is small. Moreover, operating noise may be reduced in the registration-roller less method, and the accuracy of image skew correction may be improved in the registration-roller method.

Fifth Exemplary Embodiment

Next, an image reading device and an image forming apparatus according to a fifth exemplary embodiment of the present invention will be described. Components and parts that are basically the same as those in the image reading section 16 and the image forming apparatus 10 according to the first exemplary embodiment described above (the term "same" includes similar components with partially different shapes) are given the same reference numerals or characters as in the first exemplary embodiment, and descriptions thereof will be omitted.

Referring to FIGS. 4, 5, 6, and 13, in the image reading section 16 according to the fifth exemplary embodiment, at least one document G is transported to the document G, and the skew-amount calculator 31 performs image processing (aforementioned Hough transformation) on read image information (image data) and calculates a skew amount of the leading edge of the document G. If the calculated skew amount of the leading edge of the document G is smaller than or equal to a reference value, the controller 20 determines that the leading edge of the document G has been detected, and switches the skew correction method to be used in the image reading process to the registration-roller less method. If the calculated skew amount of the leading edge of the document G is larger than the reference value, the controller 20 determines that the leading edge of the document G could not be detected, and switches the skew correction method to be used in the image reading process to the registration-roller method. In other words, the fifth exemplary embodiment relates to a method for reading a document G without performing step S62 (see FIG. 12) in the fourth exemplary embodiment.

Operation

Next, the operation according to the fifth exemplary embodiment will be described.

Figure 13:
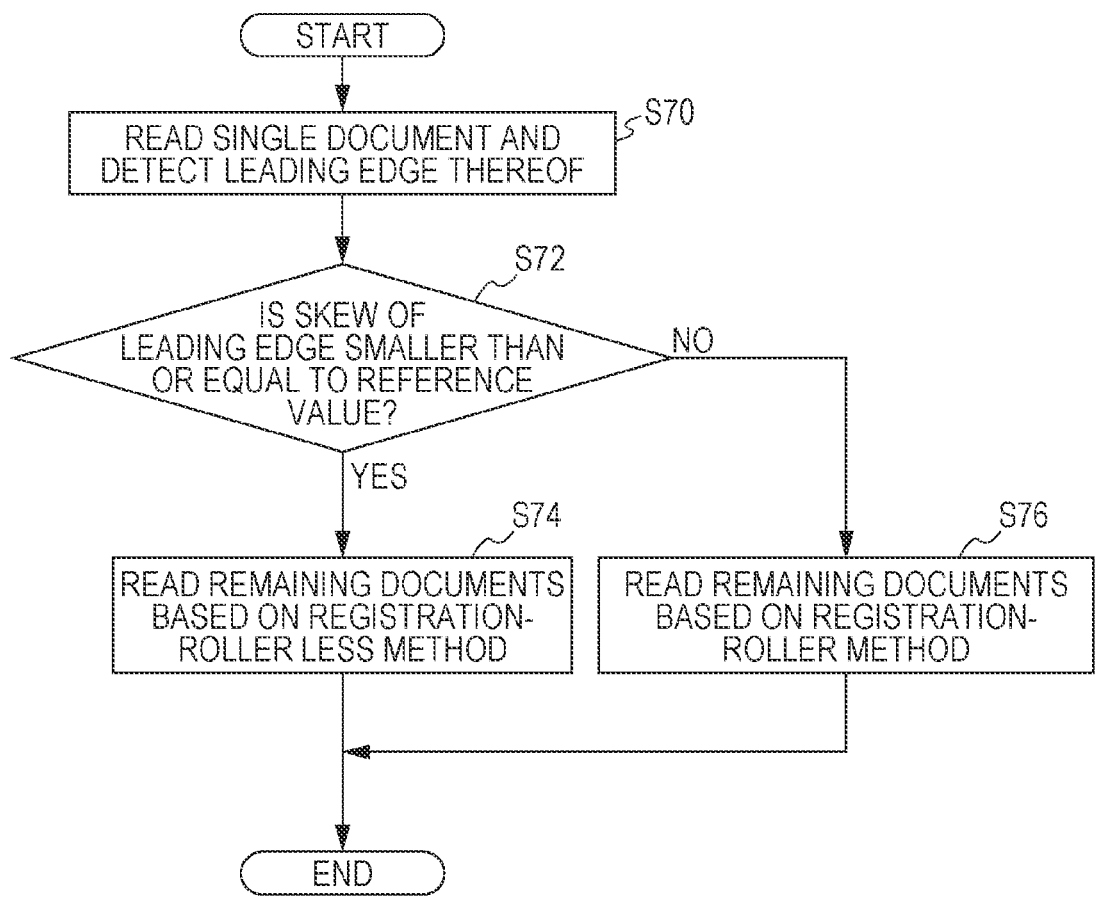
FIG. 13 is a flowchart illustrating a procedure for switching between the registration-roller method and the registration-roller less method in an image forming apparatus according to a fifth exemplary embodiment of the present invention.

The operation in the image reading section 16 according to the fifth exemplary embodiment will now be described with reference to a flowchart shown in FIG. 13. The units and components constituting the image reading section 16 are those shown in FIGS. 3 to 6, and figure numbers corresponding thereto will be omitted in the following description.

In step S70, when the user presses the read start button 17E on the operation panel 17, the reading process commences based on the registration-roller less method, and only the uppermost document G is transported. The operation then proceeds to step S72.

Subsequently, in step S72, the leading-edge detector 30 determines a skew of the leading edge of the document G from image information read based on the aforementioned method. If the skew of the leading edge is smaller than or equal to a preset reference value (reference angle), the controller 20 determines that the leading edge of the document G has been detected, and the operation proceeds to step S74 where the remaining documents G (including the provisionally read document) are read based on the registration-roller less method.

On the other hand, in step S72, if the skew of the leading edge of the document G is larger than the reference value (reference angle), the controller 20 determines that the leading edge of the document G could not be detected, and the operation proceeds to step S76 where the remaining documents G (including the provisionally read document) are read based on the registration-roller method. Consequently, documents G whose leading edges are skewed by a large amount are read based on the registration-roller method so that the accuracy of skew correction may be improved. Furthermore, documents G whose leading edges are skewed by a small amount are read based on the registration-roller less method, so that the skew of the documents G can be corrected. Consequently, the reading accuracy of each document G may be increased. Moreover, operating noise may be reduced in the registration-roller less method, and the accuracy of image skew correction may be improved in the registration-roller method.

Sixth Exemplary Embodiment

Next, an image reading device and an image forming apparatus according to a sixth exemplary embodiment of the present invention will be described. Components and parts that are basically the same as those in the image reading section 16 and the image forming apparatus 10 according to the first exemplary embodiment described above (the term "same" includes similar components with partially different shapes) are given the same reference numerals or characters as in the first exemplary embodiment, and descriptions thereof will be omitted.

Figure 14:
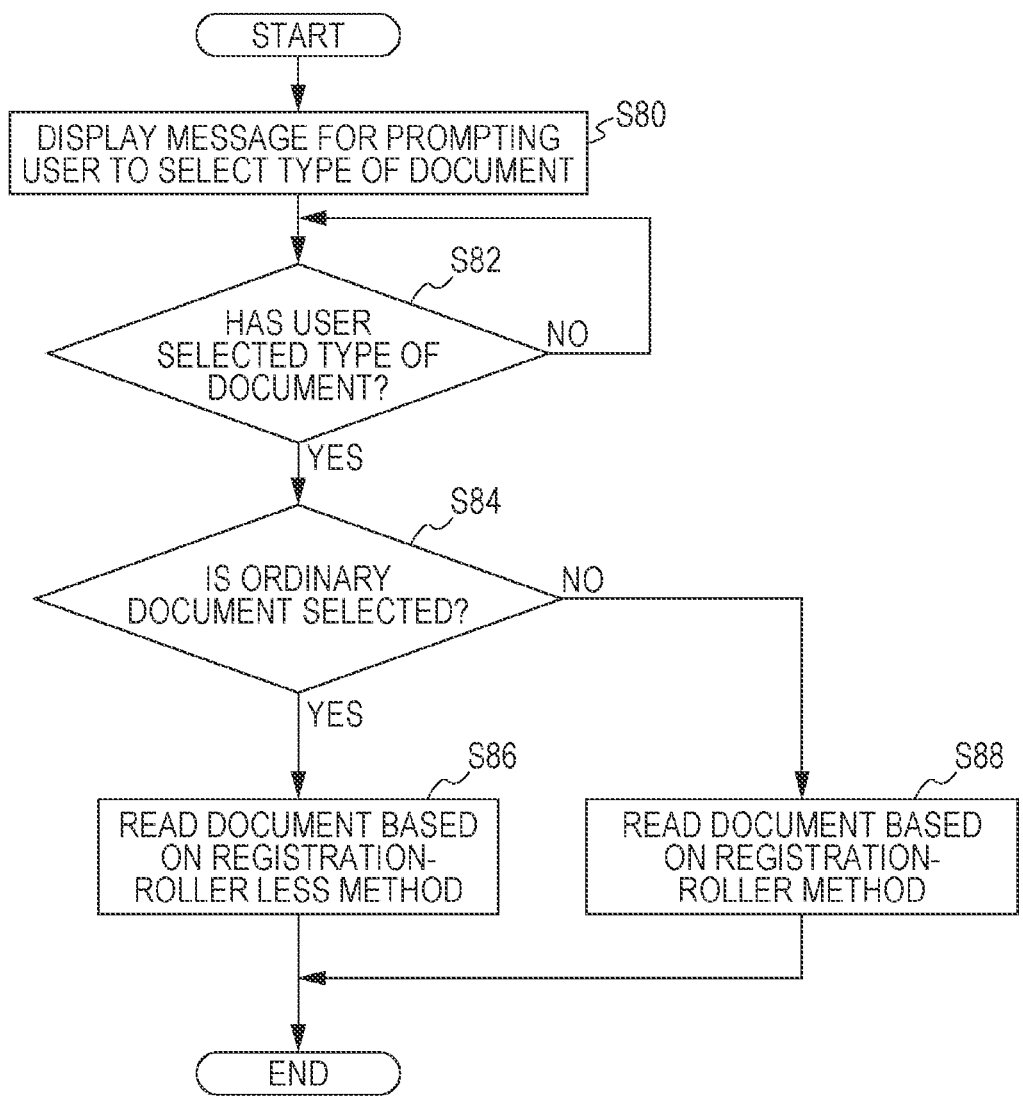
FIG. 14 is a flowchart illustrating a procedure for switching between the registration-roller method and the registration-roller less method in an image forming apparatus according to a sixth exemplary embodiment of the present invention.

Referring to FIGS. 4, 6, and 14, in the image reading section 16 according to the sixth exemplary embodiment, the controller 20 has a forced selection mode for forcibly making the user select an ordinary document or another type of document.

Operation

Next, the operation according to the sixth exemplary embodiment will be described.

The operation in the image reading section 16 according to the sixth exemplary embodiment will now be described with reference to a flowchart shown in FIG. 14. The units and components constituting the image reading section 16 are those shown in FIGS. 3 to 6, and figure numbers corresponding thereto will be omitted in the following description.

In step S80, the controller 20 makes the display panel 17A of the operation panel 17 display a message that reads "please select type of document" or "document has not been selected" so as to prompt the user to select the type of document G. The operation then proceeds to step S82.

Subsequently, in step S82, when the user selects the type of document G via the display panel 17A or the key input portion 17B, the operation proceeds to step S84. On the other hand, if the user does not select the type of document G via the display panel 17A or the key input portion 17B, the operation does not proceed to the next step until the user selects the type of document G.

Then, in step S84, if the user selects an ordinary document via the display panel 17A or the key input portion 17B, the operation proceeds to step S86 where the document G is read based on the registration-roller less method. On the other hand, if the user selects another type of document instead of an ordinary document, the operation proceeds to step S88 where the document G is read based on the registration-roller method. By forcibly making the user select the type of document G in this manner, other types of documents are prevented from being read based on the registration-roller less method, whereby the accuracy for correcting skewing of other types of documents may be improved. Moreover, operating noise may be reduced in the registration-roller less method, and the accuracy of image skew correction may be improved in the registration-roller method.

Seventh Exemplary Embodiment

Next, an image reading device and an image forming apparatus according to a seventh exemplary embodiment of the present invention will be described. Components and parts that are basically the same as those in the image reading section 16 and the image forming apparatus 10 according to the first exemplary embodiment described above (the term "same" includes similar components with partially different shapes) are given the same reference numerals or characters as in the first exemplary embodiment, and descriptions thereof will be omitted.

Figure 15:
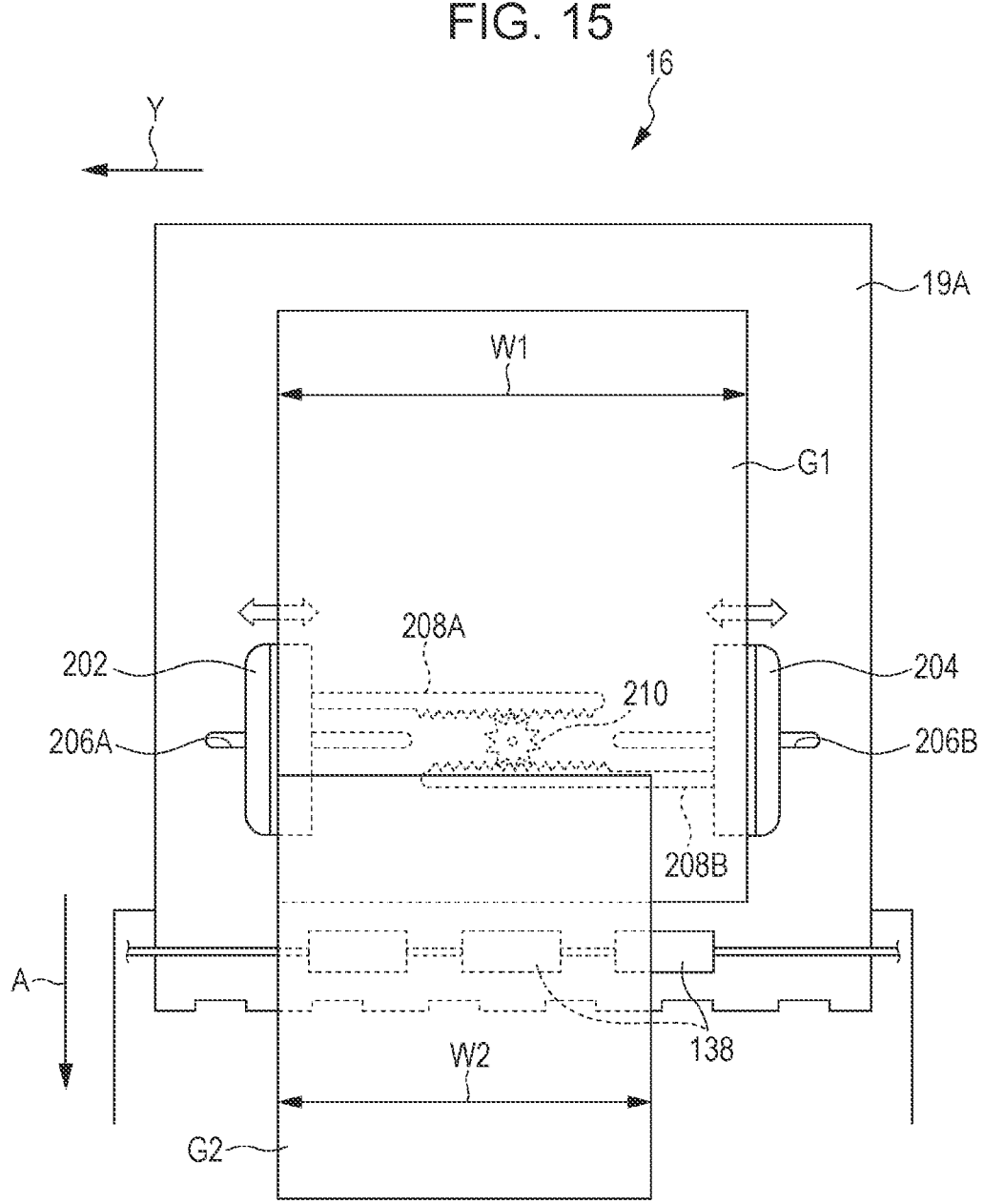
FIG. 15 is a plan view illustrating a rear guide and a front guide on a document tray according to a seventh exemplary embodiment of the present invention.

Referring to FIG. 15, in the image reading section 16 according to the seventh exemplary embodiment, a rear guide 202 and a front guide 204 as an example of regulating members for regulating (guiding) widthwise movement of documents G (G1 and G2) are provided in a movable manner on the document tray 19A. The documents G1 and G2 have different widths in the Y direction substantially orthogonal to the transport direction A, such that a width W1 of the document G1 and a width W2 of the document G2 have the following relationship: W2<W1. Furthermore, for example, the document G2 is placed on the document G1, and there are two or more documents G1.

The rear guide 202 and the front guide 204 are movable in the Y direction (i.e., the depth direction, which extends in the widthwise direction of the documents G) along slide grooves 206A and 206B, respectively, formed in the document tray 19A. Moreover, by bringing the rear guide 202 and the front guide 204 into abutment with the widthwise edges of the documents G so as to align the widthwise edges of the documents G with each other, the documents G are positioned in place by the rear guide 202 and the front guide 204.

Furthermore, the rear guide 202 and the front guide 204 are respectively connected to racks 208A and 208B provided on the bottom surface of the document tray 19A (i.e., inner surface of the document tray 19A) that is opposite the surface on which the documents G are placed. In addition, the rack 208A extending from the rear guide 202 and the rack 208B extending from the front guide 204 are connected to a pinion 210.

When a first one of the rear guide 202 and the front guide 204 slides, the second guide is slid (moved) in conjunction with the first guide due to the racks 208A and 208B and the pinion 210, such that the amount of sliding of both guides is equally controlled. The rear guide 202 and the front guide 204 are arranged at an equal distance from the central position in the Y direction.

Furthermore, as shown in FIGS. 4, 6, 15, and 16, if the image reading section 16 according to the seventh exemplary embodiment receives information indicating a mixture of documents G (for example, documents G1 and G2) having different widths in the Y direction as document information of the documents G, the controller 20 is set to switch the skew correction method to be used in the image reading process to the registration-roller method. The multiple selection keys 17C (see FIG. 3) on the operation panel 17 include a mixed documents key 17D (see FIG. 3) to be selected by the user if there is a mixture of documents G having different widths in the Y direction.

Operation

Next, the operation according to the seventh exemplary embodiment will be described.

Figure 16:
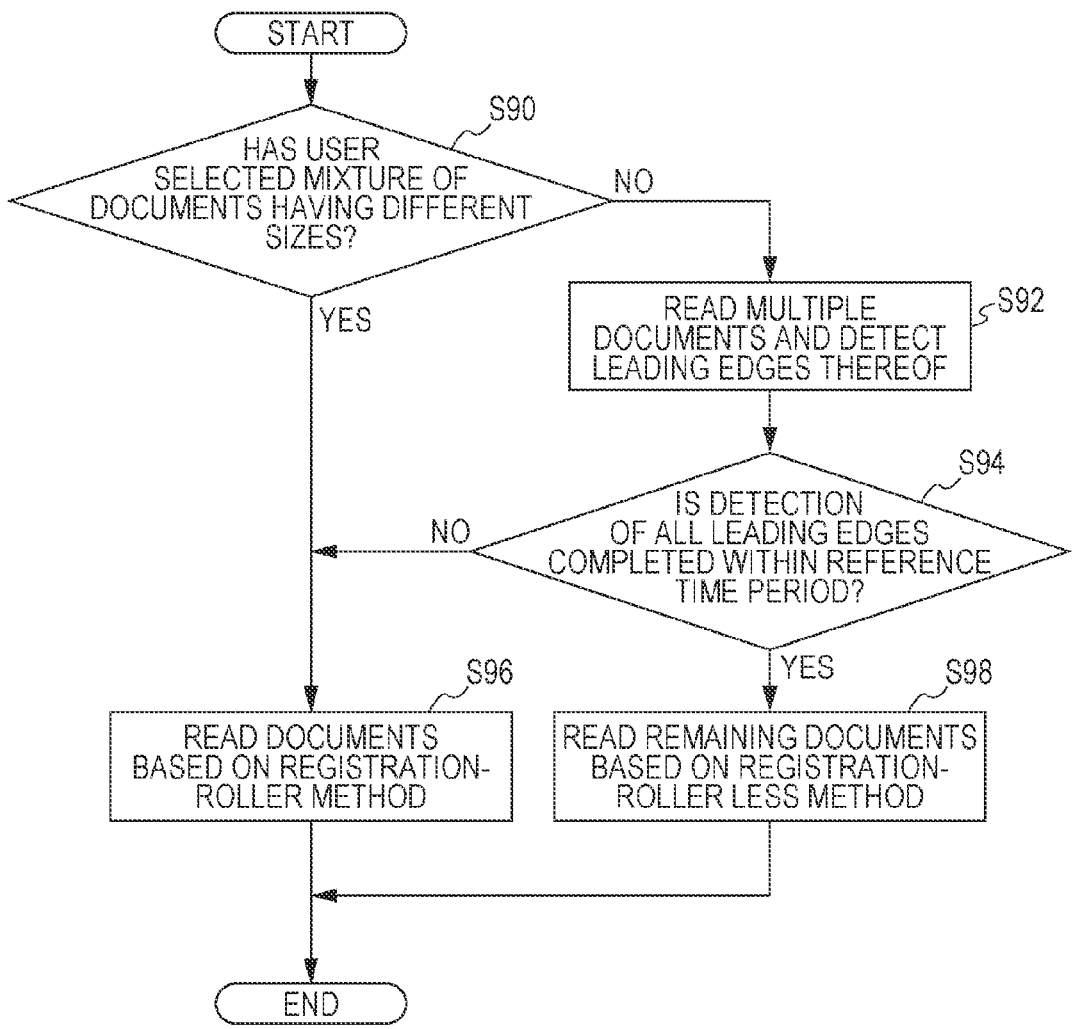
FIG. 16 is a flowchart illustrating a procedure for switching between the registration-roller method and the registration-roller less method in an image forming apparatus according to the seventh exemplary embodiment of the present invention.

The operation in the image reading section 16 according to the seventh exemplary embodiment will now be described with reference to a flowchart shown in FIG. 16. The units and components constituting the image reading section 16 are those shown in FIGS. 3 to 6 (also including FIG. 15), and figure numbers corresponding thereto will be omitted in the following description.

In step S90, when the user places the multiple documents G1 and G2 of different sizes on the document tray 19A and presses the mixed documents key 17D, the operation proceeds to step S96 where all of the documents G1 and G2 are read based on the registration-roller method. On the other hand, when the user presses the read start button 17E for the documents G without pressing the mixed documents key 17D, the operation proceeds to step S92. As an alternative example of the mixed documents key 17D, the display panel 17A (see FIG. 3) may be a touch-screen. In this case, the user may make a selection by touching a message that reads "feed mixed documents" displayed on the display panel 17A.

Subsequently, in step S92, a preset number of (e.g., three) documents G (G1 and G2) are read based on the registration-roller less method. Then, the controller 20 calculates the aforementioned time period t1 that it takes for the leading edge of each of the three read documents G to reach the reading position Q from the start of the transport process, and the operation proceeds to step S94.

Then, in step S94, if the time period t1 for each of the three documents G is shorter than the aforementioned reference time period t+α (but including t+α), the operation proceeds to step S98 where the remaining documents G (including the three provisionally read documents G) on the document tray 19A are read based on the registration-roller less method. On the other hand, if at least one of the time periods t1 calculated for the three documents G is longer than the reference time period t+α, the operation proceeds to step S96 where the remaining documents G (including the three provisionally read documents G) are read based on the registration-roller method. In step S96, in order to read the three provisionally read documents G based on the registration-roller method, a message for prompting the user to place the three documents G on the document tray 19A again may be displayed on the display panel 17A.

Accordingly, in the image reading section 16 according to the seventh exemplary embodiment, when reading a mixture of multiple documents G having different lengths in the widthwise direction and whose leading edges are expected to be skewed by a large amount during the transport process, the documents G are each read based on the contact-type registration-roller method, so that skew correction is performed on the leading edges of the documents G, whereby the reading accuracy of each document G may be increased. Furthermore, since the registration-roller less method is not used for reading these documents G, there is no skew correction performed on leading edges that are skewed by a large amount. Consequently, an image-processing load (i.e., the load on a memory or the like) is prevented from increasing. Moreover, operating noise may be reduced in the registration-roller less method, and the accuracy of image skew correction may be improved in the registration-roller method.

Eighth Exemplary Embodiment

Next, an image reading device and an image forming apparatus according to an eighth exemplary embodiment of the present invention will be described. Components and parts that are basically the same as those in the image reading section 16 and the image forming apparatus 10 according to the first exemplary embodiment described above (the term "same" includes similar components with partially different shapes) are given the same reference numerals or characters as in the first exemplary embodiment, and descriptions thereof will be omitted.

Figure 17:
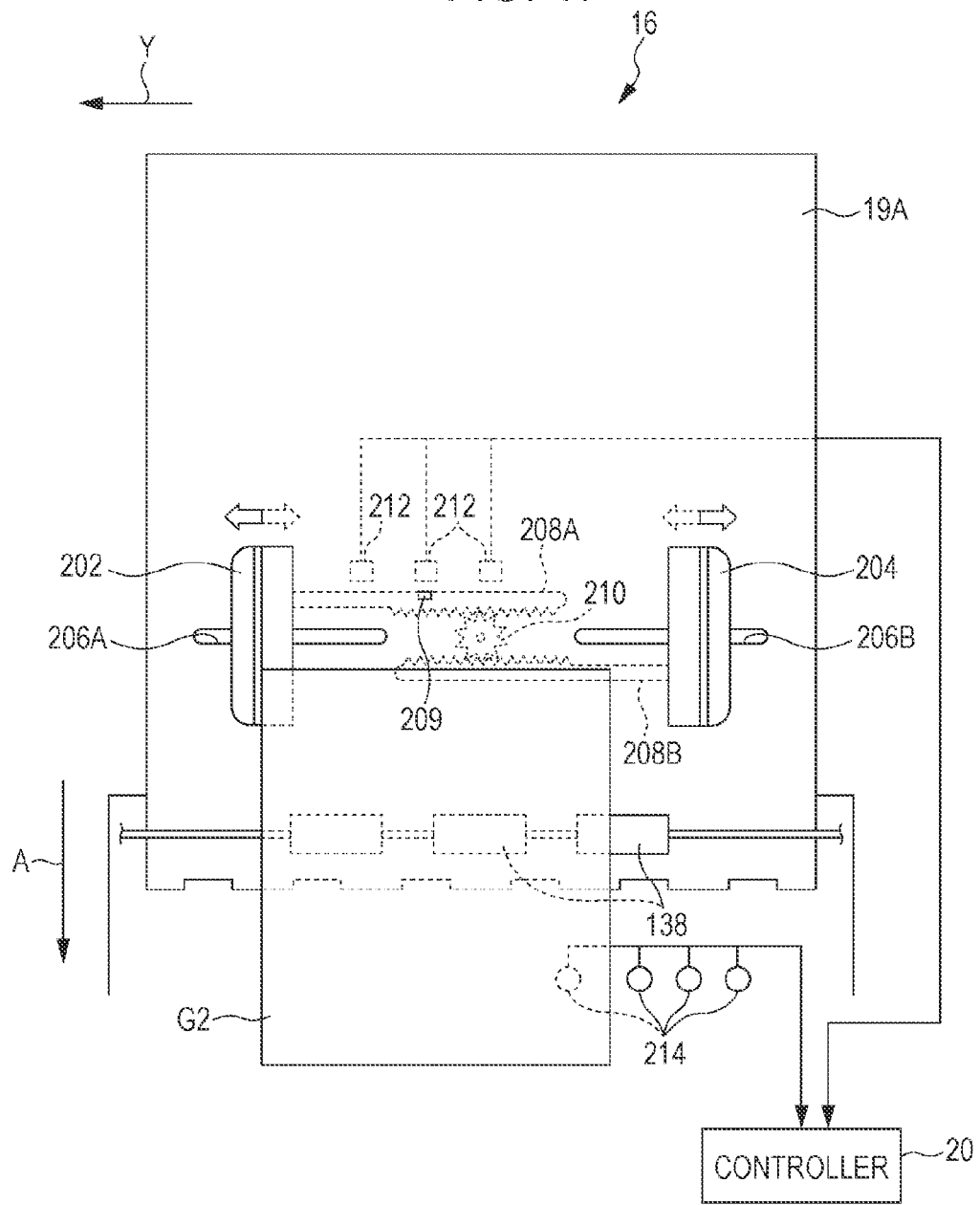
FIG. 17 is a plan view illustrating a rear guide and a front guide on a document tray according to an eighth exemplary embodiment of the present invention.

Referring to FIG. 17, the image reading section 16 according to the eighth exemplary embodiment is provided with the rear guide 202 and the front guide 204 that are movable on the document tray 19A, multiple guide sensors 212 as an example of regulating-member detecting units that detect stopped positions of the rear guide 202 and the front guide 204 in the widthwise direction (Y direction), and multiple document sensors 214 as an example of document detecting units that detect the width of a document G.

The guide sensors 212 are, for example, reflective optical sensors and are arranged at a certain pitch in the Y direction such that detection surfaces thereof that emit and receive light face a side surface of the rack 208A. Each of the guide sensors 212 outputs a signal to the controller 20 when the guide sensor 212 receives high-intensity light reflected by a reflective member 209 provided on the side surface of the rack 208A, but does output a signal to the controller 20 when the guide sensor 212 receives low-intensity light reflected by the side surface (excluding the reflective member 209) of the rack 208A.

In the controller 20, data related to the widths of documents G having sizes according to the positions of (i.e., distances between) the rear guide 202 and the front guide 204 are preliminarily set in correspondence with the guide sensors 212. Thus, when the controller 20 receives an output signal from any of the guide sensors 212, data related to the width of a document G having a size according to the positions of (i.e., the distance between) the rear guide 202 and the front guide 204 is determined.

When documents G with different widths are placed on the document tray 19A, the rear guide 202 and the front guide 204 come into abutment with the edges of a document G with the maximum width, thereby positioning the documents G. Therefore, the width of documents G detected by the guide sensors 212 corresponds to the maximum width of documents placed on the document tray 19A.

The document sensors 214 are, for example, reflective optical sensors and are arranged such that detection surfaces thereof that emit and receive light face the documents G. Furthermore, the document sensors 214 are arranged at a certain pitch in the Y direction near the downstream side of the pickup roller 138 in the transport direction A. The pitch of the document sensors 214 is set in view of detection of widths (e.g., A/B series, such as A4-vertical, A4-horizontal, A5-horizontal, B4-horizontal, and B5-vertical, or inch-based sizes) of documents expected to be read.

When a document G (G2 in FIG. 17) is present, the document sensors 214 output an ON signal as the quantity of received light decreases. Accordingly, for example, when one of the document sensors 214 is turned on, the document G is detected as being a B5-size document. When two document sensors 214 are turned on, the document G is detected as being an A4-size document. When three document sensors 214 are turned on, the document G is detected as being a B4-size document. When four document sensors 214 are turned on, the document G is detected as being an A3-size document.

Referring to FIGS. 4, 6, 17, and 18, in the image reading section 16 according to the eighth exemplary embodiment, if the document information of the document G indicates that a width A of the document G having a size according to the positions of (i.e., the distance between) the rear guide 202 and the front guide 204 detected by the guide sensors 212 differs from (i.e., does not match) a width B of the document G detected by the document sensors 214, the controller 20 switches the skew correction method to be used in the image reading process to the registration-roller method.

Operation

Next, the operation according to the eighth exemplary embodiment will be described.

Figure 18:
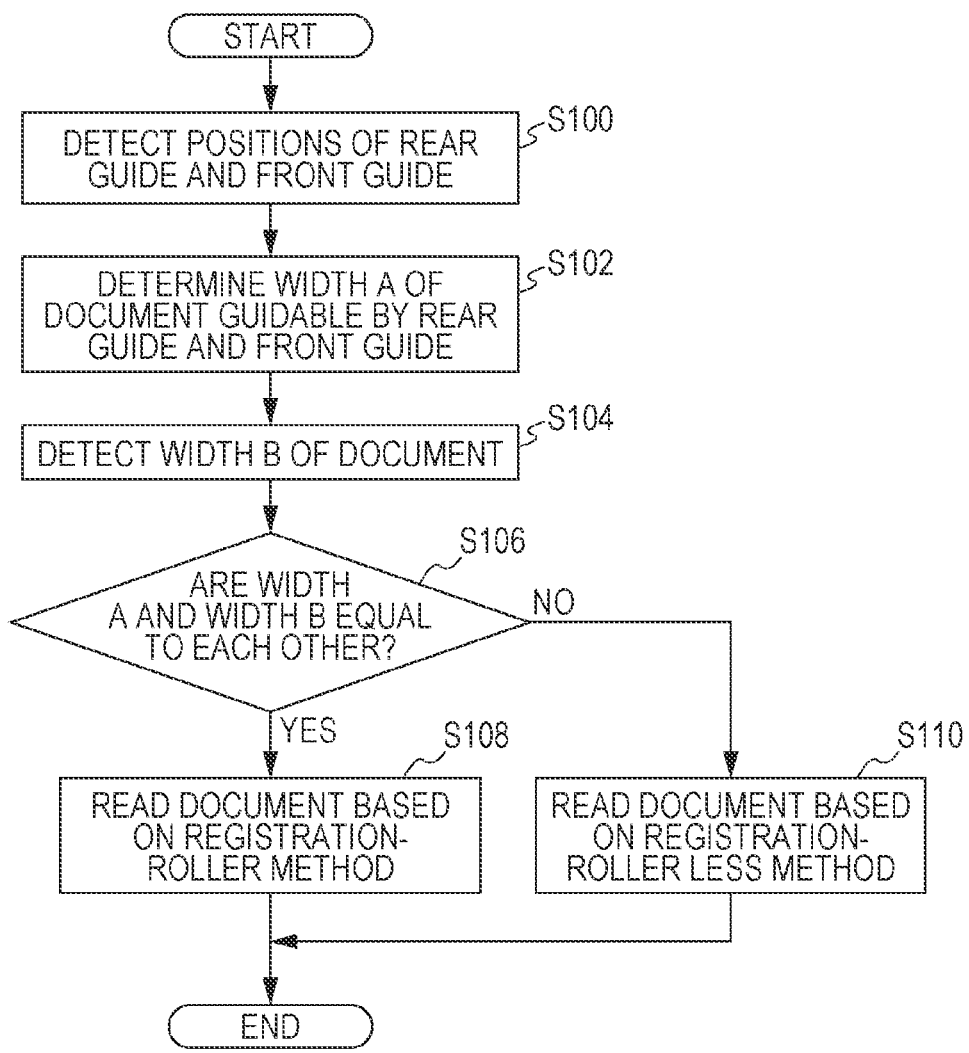
FIG. 18 is a flowchart illustrating a procedure for switching between the registration-roller method and the registration-roller less method in an image forming apparatus according to the eighth exemplary embodiment of the present invention.

The operation in the image reading section 16 according to the eighth exemplary embodiment will now be described with reference to a flowchart shown in FIG. 18. The units and components constituting the image reading section 16 are those shown in FIGS. 3 to 6 (also including FIG. 17), and figure numbers corresponding thereto will be omitted in the following description.

In step S100, the guide sensors 212 detect the positions of the rear guide 202 and the front guide 204, and the operation proceeds to step S102. Subsequently, in step S102, the width A (maximum width) of a document guidable by the rear guide 202 and the front guide 204 is determined, and the operation proceeds to step S104.

Then, in step S104, the document sensors 214 detect the width B of the document G (document G2 in FIG. 17) in the Y direction, and the operation proceeds to step S106.

Subsequently, in step S106, if the width A and the width B do not match, that is, if the distance between the rear guide 202 and the front guide 204 is larger than the width of the document G2, such that the document G2 is not guided by the rear guide 202 and the front guide 204, the operation proceeds to step S108 where the document G (G2) is read based on the registration-roller method.

On the other hand, in step S107, when the width A and the width B match, that is, when the document G2 is guided by the rear guide 202 and the front guide 204, the operation proceeds to step S110 where the document G (G2) is read based on the registration-roller less method.

Accordingly, in the image reading section 16 according to the eighth exemplary embodiment, when a document G is not guided by the rear guide 202 and the front guide 204 and it is expected that the leading edge of the document G may be skewed by a large amount during the transport process, the document G is read based on the contact-type registration-roller method, so that skew correction is performed on the leading edge of the document G, whereby the reading accuracy of the document G and the accuracy of image skew correction may be increased. Furthermore, since the registration-roller less method is not used for reading in this case, there is no skew correction performed on leading edges that are skewed by a large amount. Consequently, an image-processing load (i.e., the load on a memory or the like) is prevented from increasing. Moreover, operating noise may be reduced when using the registration-roller less method.

The eighth exemplary embodiment relates to a case where all of the documents G placed on the document tray 19A are not guided by the rear guide 202 and the front guide 204, whereas the seventh exemplary embodiment relates to a case where some of the documents G placed on the document tray 19A are not guided by the rear guide 202 and the front guide 204. In other words, the reading process performed on the mixture of documents G1 and G2 in the seventh exemplary embodiment is an example of a case where the documents G in the eighth exemplary embodiment are not guided by the rear guide 202 and the front guide 204.

The present invention is not limited to the exemplary embodiments described above.

As another type of document, an overhead-projector (OHP) sheet or a document with a bent or cutout leading edge may be set, in addition to thin paper (tracing paper). If the document G is an OHP sheet, the start of a transport process may be detected by using a contact-type sensor.

Furthermore, if the registration-roller less method is used for provisionally reading a single document G, the single provisionally read document G may be read based on the registration-roller method. The number of documents to be provisionally read is not limited to one or three, but may be two or four or more, or may even be all of the documents.

Furthermore, the various settings may be selected not only via buttons, but also via the display panel 17A (touch-screen).

Furthermore, the operation panel 17 may be provided with selection buttons for allowing the user to select the desired method from between the registration-roller less method and the registration-roller method. In this case, for example, if the user desires that a reading process be performed quietly with less operating noise during the transport process even if the reading accuracy were to be reduced, the user may select the registration-roller less method. On the other hand, if the reading accuracy is the user's priority, the user may select the registration-roller method.

In addition, when determining whether or not the leading edge of a document G has been detected, the determination may be performed based on a reference time period from a time point of detection by another sensor on the transport path to a time point of detection at the reading position Q, instead of the reference time period from the time point of detection by the registration sensor 160 to the time point of detection at the reading position Q.

Figure 8:
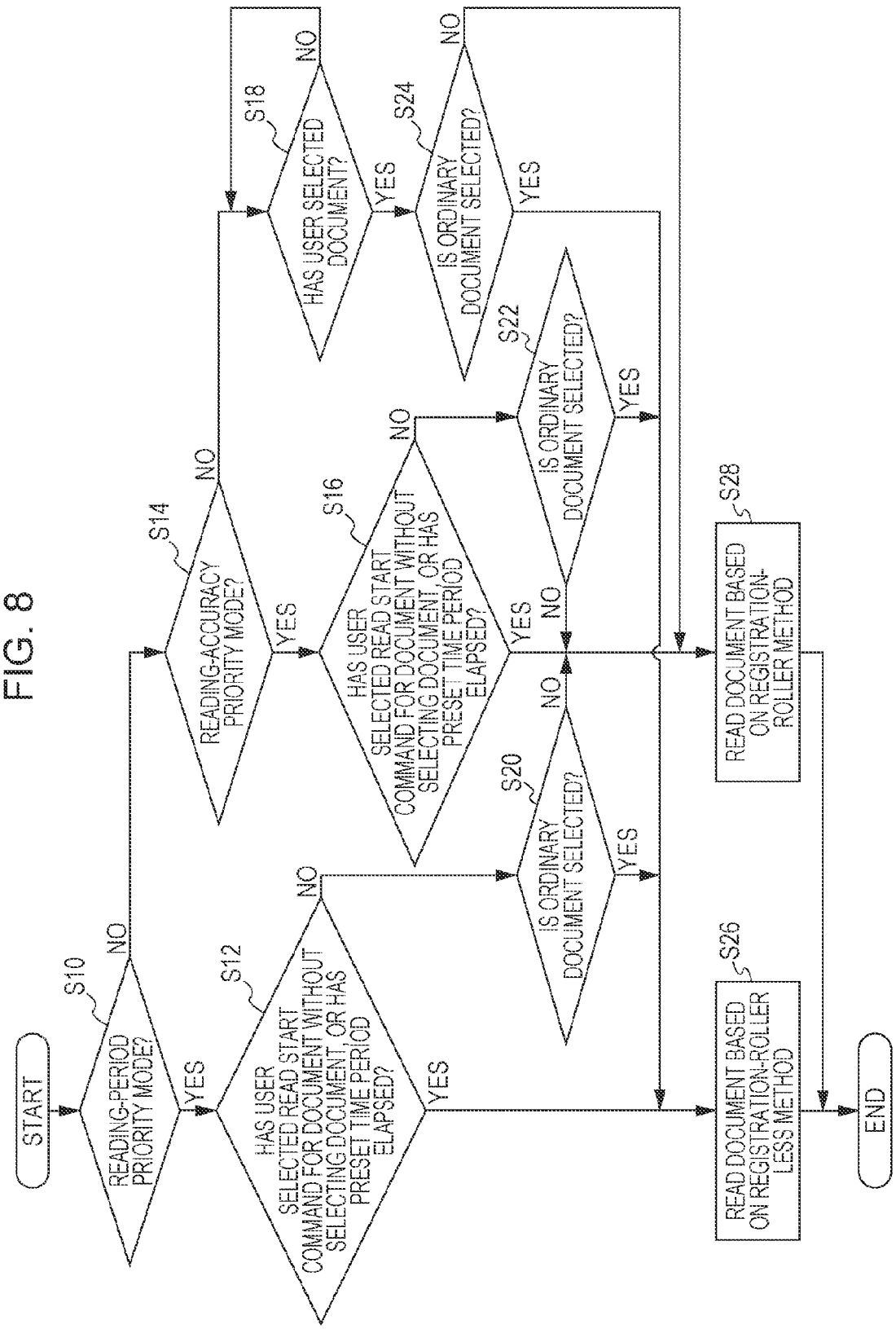
FIG. 8 is a flowchart illustrating a procedure for switching between the registration-roller method and the registration-roller less method in the image forming apparatus according to the first exemplary embodiment of the present invention.

Furthermore, the flowchart in FIG. 8 according to the first exemplary embodiment may include a forced selection mode for forcibly making the user select an ordinary document or another type of document.

Moreover, with regard to the mechanical skew correction method for a document G, a registration-gate method may be used in place of the registration-roller method. In the registration-gate method, the leading edge of a document G is brought into abutment with a gate member protruding into the first transport path 132 so that a skew of the leading edge of the document G is corrected, and the gate member is then receded (retreated from the first transport path 132) so that the document G is transported.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
   a transport unit that transports a document having an image formed thereon to a reading position;
   a first correcting unit that is provided upstream of the reading position in a transport direction of the document and that corrects a skew of the document by coming into contact with a leading edge of the document;
   a radiating unit that radiates light to the document at the reading position;
   an image-information acquiring unit that acquires information of the image formed on the document on the basis of information of light reflected by the document;
   a reflecting unit that is provided opposite the radiating unit with the document interposed therebetween at the reading position and that reflects the light radiated from the radiating unit;
   a leading-edge detecting unit that compares a quantity of the light reflected by the reflecting unit with a quantity of the light reflected by the document so as to detect the leading edge of the document passing through the reading position;
   a skew-amount calculating unit that calculates a skew amount of the leading edge of the document detected by the leading-edge detecting unit; and
   a second correcting unit that corrects a skew of the image information acquired by the image-information acquiring unit on the basis of the skew amount of the leading edge calculated by the skew-amount calculating unit,
   wherein the image reading device switches between the skew correction by the first correcting unit and the skew correction by the second correcting unit on the basis of document information, the skew amount of the leading edge calculated by the skew-amount calculating unit, or user's selection.

2. The image reading device according to claim 1, further comprising a document selecting unit to be used by the user for selecting a type of document in advance, wherein the image reading device switches between the skew correction by the first correcting unit and the skew correction by the second correcting unit on the basis of the user's selection.

3. The image reading device according to claim 2, wherein the image reading device has a reading-period priority mode for prioritizing reduction of a reading period for the document, wherein in the reading-period priority mode, the image reading device switches to the skew correction by the second correcting unit if the type of document is not selected by the user.

4. The image reading device according to claim 3, wherein the image reading device has a reading-accuracy priority mode for prioritizing reading accuracy of the document, wherein in the reading-accuracy priority mode, the image reading device switches to the skew correction by the first correcting unit if the type of document is not selected by the user.

5. The image reading device according to claim 2, wherein the image reading device has a reading-accuracy priority mode for prioritizing reading accuracy of the document, wherein in the reading-accuracy priority mode, the image reading device switches to the skew correction by the first correcting unit if the type of document is not selected by the user.

6. The image reading device according to claim 1, wherein the image reading device switches to the skew correction by the first correcting unit if the document information indicates a mixture of documents having different lengths in a widthwise direction substantially orthogonal to the transport direction.

7. The image reading device according to claim 1, further comprising:
   a regulating member that is provided in a movable manner on a document loading portion and that regulates movement of the document in a widthwise direction substantially orthogonal to the transport direction;
   a regulating-member detecting unit that detects a stopped position of the regulating member in the widthwise direction; and
   a document detecting unit that detects a width of the document,
   wherein the image reading device switches to the skew correction by the first correcting unit if the document information indicates that a width of the document having a size according to the position of the regulating member detected by the regulating-member detecting unit differs from the width of the document detected by the document detecting unit.

8. The image reading device according to claim 1, wherein at least one document is transported to the reading position, and the skew amount of the leading edge thereof is calculated by the skew-amount calculating unit, and wherein the image reading device switches to the skew correction by the first correcting unit if the calculated skew amount of the leading edge is larger than a reference value.

9. The image reading device according to claim 1, wherein at least one document is transported to the reading position, and the leading-edge detecting unit performs detection of the leading edge thereof, and wherein the image reading device switches to the skew correction by the second correcting unit if the leading-edge detecting unit detects the leading edge of the document, or switches to the skew correction by the first correcting unit if the leading-edge detecting unit cannot detect the leading edge of the document.

10. The image reading device according to claim 9, wherein the image reading device determines that the leading edge of the document is detected by the leading-edge detecting unit if a time period from the start of a transport process of the document to the detection of the leading edge of the document is shorter than or equal to a reference time period.

11. The image reading device according to claim 9, further comprising an upstream-side detector that is provided upstream of the reading position in the transport direction and that detects the leading edge of the document transported by the transport unit, wherein the image reading device determines that the leading edge of the document is detected if a time period $\Delta T=T1-T0$ is shorter than a reference time period, and switches to the skew correction by the second correcting unit, or switches to the skew correction by the first correcting unit if the time period $\Delta T$ is longer than or equal to the reference time period, T0 denoting a time point at which the leading edge of the document is detected by the upstream-side detector, T1 denoting a time point at which the leading edge of the document detected by the upstream-side detector is detected by the leading-edge detecting unit.

12. The image reading device according to claim 11, wherein a second reference time period that is shorter than the reference time period is set, and the image reading device switches to the skew correction by the second correcting unit if the time period $\Delta T$ is longer than the second reference time period and is shorter than the reference time period, and wherein the second correcting unit corrects a position of the image information acquired by the image-information acquiring unit by an amount equivalent to a displacement amount of the leading edge of the document obtained on the basis of the time period $\Delta T$.

13. The image reading device according to claim 9, wherein the image reading device determines that the leading edge of the document is detected if the skew amount of the leading edge calculated by the skew-amount calculating unit is smaller than or equal to a reference value, and switches to the skew correction by the second correcting unit.

14. An image forming apparatus comprising:
the image reading device according to claim 1; and
an image forming unit that forms an image on a recording medium on the basis of image information read by the image reading device.

15. An image reading method comprising:
transporting a document having an image formed thereon to a reading position;
performing first skew correction for correcting a skew of the document at an upstream side of the reading position in a transport direction of the document;
radiating light to the document at the reading position;
acquiring information of the image formed on the document on the basis of information of light reflected by the document;
reflecting the radiated light;
comparing a quantity of the reflected radiated light with a quantity of the light reflected by the document so as to detect a leading edge of the document passing through the reading position;
calculating a skew amount of the detected leading edge of the document;
performing second skew correction for correcting a skew of the acquired image information on the basis of the calculated skew amount of the leading edge; and
switching between the first skew correction and the second skew correction on the basis of document information, the calculated skew amount of the leading edge, or user's selection.

* * * * *